US011968313B2

(12) United States Patent
Attard et al.

(10) Patent No.: US 11,968,313 B2
(45) Date of Patent: Apr. 23, 2024

(54) GENERATING A LEGALLY BINDING OBJECT WITHIN A GROUP-BASED COMMUNICATION SYSTEM

(71) Applicant: Slack Technologies, LLC, San Francisco, CA (US)

(72) Inventors: Samuel Attard, Vancouver (CA); Felix Rieseberg, San Francisco, CA (US); Deani Hansen, Vancouver (CA); Jan Hannemann, Victoria (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/896,044

(22) Filed: Aug. 25, 2022

(65) Prior Publication Data

US 2022/0417033 A1 Dec. 29, 2022

Related U.S. Application Data

(63) Continuation of application No. 16/942,302, filed on Jul. 29, 2020, now Pat. No. 11,431,505.
(Continued)

(51) Int. Cl.
*H04L 9/40* (2022.01)
*G06F 21/64* (2013.01)
(Continued)

(52) U.S. Cl.
CPC ............ *H04L 9/3247* (2013.01); *G06F 21/64* (2013.01); *G06Q 10/10* (2013.01); *G06Q 2220/00* (2013.01)

(58) Field of Classification Search
CPC ....... H04L 9/3247; G06F 21/64; G06Q 10/10; G06Q 2220/00
See application file for complete search history.

(56) References Cited

U.S. PATENT DOCUMENTS 6,959,382 B1 * 10/2005 Kinnis .................. H04L 9/3247
713/168
8,393,001 B1 * 3/2013 Libenzi ................. H04L 9/3247
717/172
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Ghodrat Jamshidi
(74) *Attorney, Agent, or Firm* — Lee & Hayes, P.C.

(57) ABSTRACT

Techniques for facilitating a digital signature occurrence associated with an object transmitted via a communication channel associated with a group-based communication platform. The object may be created by a user within either the group-based communication platform or a third-party application and transmitted to one or more other users associated with the communication channel via the group-based communication platform. The group-based communication platform may be configured to authenticate a digital signature and, based on a verification of the authenticity, associate the digital signature with the object. The group-based communication platform may cause the digital signature to be presented via an interface associated with the communication channel, such as proximate to or viewable in association with the object.

20 Claims, 10 Drawing Sheets

Related U.S. Application Data

(60) Provisional application No. 62/880,286, filed on Jul. 30, 2019.

(51) Int. Cl.
    *G06Q 10/10*     (2023.01)
    *H04L 9/32*     (2006.01)

(56) References Cited

U.S. PATENT DOCUMENTS

| | | | |
|---|---|---|---|
| 9,230,130 B2 | 1/2016 | Peterson et al. | |
| 9,313,032 B2* | 4/2016 | Oswalt | H04L 63/123 |
| 9,509,506 B2* | 11/2016 | Hughes | H04L 9/3247 |
| 9,967,103 B2* | 5/2018 | Kumar | G06Q 10/103 |
| 10,621,629 B2* | 4/2020 | Bakun | G06Q 30/0279 |
| 10,841,784 B2 | 11/2020 | Wang et al. | |
| 2002/0162003 A1* | 10/2002 | Ahmed | H04L 63/12 713/176 |
| 2004/0044996 A1 | 3/2004 | Atallah | |
| 2004/0117726 A1 | 6/2004 | Inada et al. | |
| 2006/0112419 A1 | 5/2006 | Brown et al. | |
| 2015/0129655 A1 | 5/2015 | Naik et al. | |
| 2015/0261799 A1 | 9/2015 | Winstead | |
| 2016/0226664 A1* | 8/2016 | Tang | H04L 9/0618 |
| 2018/0026967 A1* | 1/2018 | Mino | H04L 63/105 726/6 |
| 2018/0287982 A1 | 10/2018 | Draeger et al. | |
| 2019/0058680 A1* | 2/2019 | Rosania | H04L 51/216 |
| 2019/0149340 A1 | 5/2019 | Barton et al. | |
| 2019/0377814 A1 | 12/2019 | Shtrom et al. | |
| 2020/0073992 A1 | 3/2020 | Grosset et al. | |
| 2020/0258176 A1* | 8/2020 | Gibson | G06F 21/32 |
| 2021/0036867 A1 | 2/2021 | Attard et al. | |
| 2021/0233672 A1* | 7/2021 | Patil | H04W 4/70 |

OTHER PUBLICATIONS

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T et al., "Chocoa Communicator—A New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 3 pages.

\* cited by examiner

500 ⟶

```
┌──────────────────────────────────────────────────────────────────────────────────┐
│ RECEIVE A GROUP-BASED COMMUNICATION OBJECT, THE GROUP-BASED COMMUNICATION OBJECT  │
│ HAVING ASSOCIATED THEREWITH, A GROUP-BASED COMMUNICATION OBJECT IDENTIFIER, A     │
│ GROUP-BASED COMMUNICATION CHANNEL IDENTIFIER, A SENDING USER IDENTIFIER, AND A    │
│ FIRST USER IDENTIFIER                                                             │
│                                      502                                          │
└──────────────────────────────────────────────────────────────────────────────────┘
```

```
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ RECEIVE FROM A SECOND CLIENT DEVICE ASSOCIATED WITH A SECOND USER IDENTIFIER AN   │
│ AUTHENTICATED GROUP-BASED COMMUNICATION OBJECT REQUEST ASSOCIATED WITH THE        │
│ GROUP-BASED COMMUNICATION OBJECT, THE AUTHENTICATED GROUP-BASED COMMUNICATION     │
│ OBJECT REQUEST COMPRISING AN AUTHENTICATED GROUP-BASED COMMUNICATION OBJECT       │
│ REQUEST DATA PACKET ASSOCIATED WITH THE GROUP-BASED COMMUNICATION OBJECT, A       │
│ REQUESTED SIGNATORY IDENTIFIER, AND THE SECOND USER IDENTIFIER, WHEREIN THE       │
│ REQUESTED SIGNATORY IDENTIFIER IS ASSOCIATED WITH THE FIRST USER IDENTIFIER       │
│                                      520                                          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

```
┌──────────────────────────────────────────────────────────────────────────────────┐
│ RECEIVE A DIGITAL SIGNATURE EXECUTION REQUEST FROM THE FIRST CLIENT DEVICE, THE   │
│ DIGITAL SIGNATURE EXECUTION REQUEST BEING ASSOCIATED WITH THE GROUP-BASED         │
│ COMMUNICATION OBJECT, THE FIRST USER IDENTIFIER, AND THE DIGITAL SIGNATURE DATA   │
│ STRUCTURE                                                                         │
│                                      504                                          │
└──────────────────────────────────────────────────────────────────────────────────┘
```

```
┌──────────────────────────────────────────────────────────────────────────────────┐
│ TRANSMIT A DIGITAL SIGNATURE DATA STRUCTURE REQUEST SIGNAL ASSOCIATED WITH THE    │
│ DIGITAL SIGNATURE DATA STRUCTURE TO A THIRD PARTY DIGITAL SIGNATURE RESOURCE      │
│                                      506                                          │
└──────────────────────────────────────────────────────────────────────────────────┘
```

```
┌──────────────────────────────────────────────────────────────────────────────────┐
│ RECEIVE A DIGITAL SIGNATURE DATA STRUCTURE ASSOCIATED WITH THE FIRST USER         │
│ IDENTIFIER FROM A FIRST CLIENT DEVICE, THE DIGITAL SIGNATURE DATA STRUCTURE       │
│ COMPRISING A DIGITAL SIGNATURE SIGNATORY IDENTIFIER, A DIGITAL SIGNATURE          │
│ TIMESTAMP, AND A DIGITAL SIGNATURE CONTENT                                        │
│                                      508                                          │
└──────────────────────────────────────────────────────────────────────────────────┘
```

```
┌──────────────────────────────────────────────────────────────────────────────────┐
│ ASSOCIATE THE DIGITAL SIGNATURE DATA STRUCTURE WITH THE GROUP-BASED               │
│ COMMUNICATION OBJECT                                                              │
│                                      510                                          │
└──────────────────────────────────────────────────────────────────────────────────┘
```

```
┌──────────────────────────────────────────────────────────────────────────────────┐
│ UPON VERIFYING AN IDENTIFY OF A DIGITAL SIGNATURE SIGNATORY ASSOCIATED WITH THE   │
│ DIGITAL SIGNATURE SIGNATORY IDENTIFIER, GENERATE A VERIFIED SIGNATORY INDICATOR   │
│                                      512                                          │
└──────────────────────────────────────────────────────────────────────────────────┘
```

```
┌──────────────────────────────────────────────────────────────────────────────────┐
│ UPON VERIFYING AN INTEGRITY OF THE GROUP-BASED COMMUNICATION OBJECT, GENERATE A   │
│ VERIFIED INTEGRITY INDICATOR                                                      │
│                                      514                                          │
└──────────────────────────────────────────────────────────────────────────────────┘
```

```
┌──────────────────────────────────────────────────────────────────────────────────┐
│ UPON VERIFYING THE IDENTITY OF THE DIGITAL SIGNATURE SIGNATORY AND THE INTEGRITY  │
│ OF THE GROUP-BASED COMMUNICATION OBJECT, CREATE A LEGALLY BINDING STATEMENT DATA  │
│ STRUCTURE BY ASSOCIATING THE VERIFIED SIGNATORY INDICATOR AND THE VERIFIED        │
│ INTEGRITY INDICATOR WITH THE GROUP-BASED COMMUNICATION OBJECT AND THE DIGITAL     │
│ SIGNATURE DATA STRUCTURE                                                          │
│                                      516                                          │
└──────────────────────────────────────────────────────────────────────────────────┘
```

```
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ UPON VERIFYING THE IDENTITY OF THE DIGITAL SIGNATURE SIGNATORY AND THE INTEGRITY  │
│ OF THE GROUP-BASED COMMUNICATION OBJECT, TRANSMIT A COMPLETED DIGITAL SIGNATURE   │
│ OCCURRENCE INDICATOR TO THE SECOND CLIENT DEVICE AND THE FIRST CLIENT DEVICE,     │
│ WHEREIN THE COMPLETED DIGITAL SIGNATURE OCCURRENCE INDICATOR IS ASSOCIATED WITH   │
│ THE LEGALLY BINDING STATEMENT DATA STRUCTURE, THE GROUP-BASED COMMUNICATION       │
│ OBJECT, THE GROUP-BASED COMMUNICATION CHANNEL IDENTIFIER, AND THE DIGITAL         │
│ SIGNATURE DATA STRUCTURE                                                          │
│                                      522                                          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

```
┌──────────────────────────────────────────────────────────────────────────────────┐
│ APPEND A DO-NOT-EDIT FLAG AND A DO-NOT-DELETE FLAG TO THE LEGALLY BINDING         │
│ STATEMENT DATA STRUCTURE                                                          │
│                                      518                                          │
└──────────────────────────────────────────────────────────────────────────────────┘
```

```
┌─────────────────────────────────────────────────────────────────────────────┐
│ RECEIVE A GROUP-BASED COMMUNICATION OBJECT, THE GROUP-BASED COMMUNICATION   │
│ OBJECT HAVING ASSOCIATED THEREWITH, A GROUP-BASED COMMUNICATION OBJECT      │
│ IDENTIFIER, A GROUP-BASED COMMUNICATION CHANNEL IDENTIFIER, A SENDING USER  │
│ IDENTIFIER, AND A FIRST USER IDENTIFIER                                     │
│                                   602                                       │
└─────────────────────────────────────────────────────────────────────────────┘
                                    ▼
┌─────────────────────────────────────────────────────────────────────────────┐
│ RECEIVE A DIGITAL SIGNATURE EXECUTION REQUEST FROM THE FIRST CLIENT DEVICE, │
│ THE DIGITAL SIGNATURE EXECUTION REQUEST BEING ASSOCIATED WITH THE           │
│ GROUP-BASED COMMUNICATION OBJECT, THE FIRST USER IDENTIFIER, AND THE        │
│ DIGITAL SIGNATURE DATA STRUCTURE                                            │
│                                   604                                       │
└─────────────────────────────────────────────────────────────────────────────┘
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ TRANSMIT A DIGITAL SIGNATURE CONSENT VERIFICATION DATA PACKET TO THE FIRST  │
│ CLIENT DEVICE, WHEREIN THE DIGITAL SIGNATURE CONSENT VERIFICATION DATA      │
│ PACKET COMPRISES INFORMATION DIRECTED TO CONFIRM A USER'S INTENT AND        │
│ CONSENT TO CONDUCT BUSINESS ELECTRONICALLY; AND RECEIVE A CONFIRMED         │
│ DIGITAL SIGNATURE CONSENT VERIFICATION DATA PACKET FROM THE FIRST CLIENT    │
│ DEVICE, WHEREIN THE CONFIRMED DIGITAL SIGNATURE CONSENT VERIFICATION DATA   │
│ PACKET COMPRISES A SIGNATURE CONSENT VERIFICATION DATA PACKET, THE DATA OF  │
│ WHICH HAS BEEN MODIFIED TO INDICATE AN AFFIRMATIVE INTENT AND CONSENT TO    │
│ CONDUCT BUSINESS ELECTRONICALLY                                             │
│                                   620                                       │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                    ▼
┌─────────────────────────────────────────────────────────────────────────────┐
│ TRANSMIT A DIGITAL SIGNATURE DATA STRUCTURE REQUEST SIGNAL ASSOCIATED WITH  │
│ THE DIGITAL SIGNATURE DATA STRUCTURE TO A THIRD PARTY DIGITAL SIGNATURE     │
│ RESOURCE                                                                    │
│                                   606                                       │
└─────────────────────────────────────────────────────────────────────────────┘
                                    ▼
┌─────────────────────────────────────────────────────────────────────────────┐
│ RECEIVE A DIGITAL SIGNATURE DATA STRUCTURE ASSOCIATED WITH THE FIRST USER   │
│ IDENTIFIER FROM A FIRST CLIENT DEVICE, THE DIGITAL SIGNATURE DATA STRUCTURE │
│ COMPRISING A DIGITAL SIGNATURE SIGNATORY IDENTIFIER, A DIGITAL SIGNATURE    │
│ TIMESTAMP, AND A DIGITAL SIGNATURE CONTENT                                  │
│                                   608                                       │
└─────────────────────────────────────────────────────────────────────────────┘
                                    ▼
┌─────────────────────────────────────────────────────────────────────────────┐
│ ASSOCIATE THE DIGITAL SIGNATURE DATA STRUCTURE WITH THE GROUP-BASED         │
│ COMMUNICATION OBJECT                                                        │
│                                   610                                       │
└─────────────────────────────────────────────────────────────────────────────┘
                                    ▼
┌─────────────────────────────────────────────────────────────────────────────┐
│ UPON VERIFYING AN IDENTIFY OF A DIGITAL SIGNATURE SIGNATORY ASSOCIATED WITH │
│ THE DIGITAL SIGNATURE SIGNATORY IDENTIFIER, GENERATE A VERIFIED SIGNATORY   │
│ INDICATOR                                                                   │
│                                   612                                       │
└─────────────────────────────────────────────────────────────────────────────┘
                                    ▼
┌─────────────────────────────────────────────────────────────────────────────┐
│ UPON VERIFYING AN INTEGRITY OF THE GROUP-BASED COMMUNICATION OBJECT,        │
│ GENERATE A VERIFIED INTEGRITY INDICATOR                                     │
│                                   614                                       │
└─────────────────────────────────────────────────────────────────────────────┘
                                    ▼
┌─────────────────────────────────────────────────────────────────────────────┐
│ UPON VERIFYING THE IDENTITY OF THE DIGITAL SIGNATURE SIGNATORY AND THE      │
│ INTEGRITY OF THE GROUP-BASED COMMUNICATION OBJECT, CREATE A LEGALLY BINDING │
│ STATEMENT DATA STRUCTURE BY ASSOCIATING THE VERIFIED SIGNATORY INDICATOR    │
│ AND THE VERIFIED INTEGRITY INDICATOR WITH THE GROUP-BASED COMMUNICATION     │
│ OBJECT AND THE DIGITAL SIGNATURE DATA STRUCTURE                             │
│                                   616                                       │
└─────────────────────────────────────────────────────────────────────────────┘
                                    ▼
┌─────────────────────────────────────────────────────────────────────────────┐
│ APPEND A DO-NOT-EDIT FLAG AND A DO-NOT-DELETE FLAG TO THE LEGALLY BINDING   │
│ STATEMENT DATA STRUCTURE                                                    │
│                                   618                                       │
└─────────────────────────────────────────────────────────────────────────────┘
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ TRANSMIT ONE OR MORE AUTHENTICATED GROUP-BASED COMMUNICATION OBJECT         │
│ CONFIRMATION REQUESTS TO ONE OR MORE ADDITIONAL CLIENT DEVICES, THE ONE OR  │
│ MORE ADDITIONAL CLIENT DEVICES BEING ASSOCIATED WITH ONE OR MORE USER       │
│ IDENTIFIERS ASSOCIATED WITH ACCESS RIGHTS TO A GROUP-BASED CHANNEL          │
│ ASSOCIATED WITH THE GROUP-BASED CHANNEL IDENTIFIER, AND RECEIVE CONFIRMED   │
│ AUTHENTICATED GROUP-BASED COMMUNICATION OBJECT CONFIRMATION DATA FROM THE   │
│ ONE OR MORE ADDITIONAL CLIENT DEVICES                                       │
│                                   622                                       │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

```
┌─────────────────────────────────────────────────────────────────────────────┐
│ RECEIVE A GROUP-BASED COMMUNICATION OBJECT, THE GROUP-BASED COMMUNICATION   │
│ OBJECT HAVING ASSOCIATED THEREWITH, A GROUP-BASED COMMUNICATION OBJECT      │
│ IDENTIFIER, A GROUP-BASED COMMUNICATION CHANNEL IDENTIFIER, A SENDING USER  │
│ IDENTIFIER, AND A FIRST USER IDENTIFIER                                     │
│                                    702                                      │
└─────────────────────────────────────────────────────────────────────────────┘
                                     ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  RECEIVE A PLURALITY OF GROUP-BASED COMMUNICATION OBJECTS IN THE GROUP-BASED│
│ COMMUNICATION CHANNEL; AND PARSE EACH GROUP-BASED COMMUNICATION OBJECT OF   │
│ THE PLURALITY OF GROUP-BASED COMMUNICATION OBJECTS TO DETECT AN             │
│ AUTHENTICATED GROUP-BASED COMMUNICATION OBJECT REQUEST DATA PACKET          │
│ ASSOCIATED THEREWITH                                                        │
│                                    720                                      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                     ▼
┌─────────────────────────────────────────────────────────────────────────────┐
│ RECEIVE A DIGITAL SIGNATURE EXECUTION REQUEST FROM THE FIRST CLIENT DEVICE, │
│ THE DIGITAL SIGNATURE EXECUTION REQUEST BEING ASSOCIATED WITH THE GROUP-    │
│ BASED COMMUNICATION OBJECT, THE FIRST USER IDENTIFIER, AND THE DIGITAL      │
│ SIGNATURE DATA STRUCTURE                                                    │
│                                    704                                      │
└─────────────────────────────────────────────────────────────────────────────┘
                                     ▼
┌─────────────────────────────────────────────────────────────────────────────┐
│ TRANSMIT A DIGITAL SIGNATURE DATA STRUCTURE REQUEST SIGNAL ASSOCIATED WITH  │
│ THE DIGITAL SIGNATURE DATA STRUCTURE TO A THIRD PARTY DIGITAL SIGNATURE     │
│ RESOURCE                                                                    │
│                                    706                                      │
└─────────────────────────────────────────────────────────────────────────────┘
                                     ▼
┌─────────────────────────────────────────────────────────────────────────────┐
│ RECEIVE A DIGITAL SIGNATURE DATA STRUCTURE ASSOCIATED WITH THE FIRST USER   │
│ IDENTIFIER FROM A FIRST CLIENT DEVICE, THE DIGITAL SIGNATURE DATA STRUCTURE │
│ COMPRISING A DIGITAL SIGNATURE SIGNATORY IDENTIFIER, A DIGITAL SIGNATURE    │
│ TIMESTAMP, AND A DIGITAL SIGNATURE CONTENT                                  │
│                                    708                                      │
└─────────────────────────────────────────────────────────────────────────────┘
                                     ▼
┌─────────────────────────────────────────────────────────────────────────────┐
│ ASSOCIATE THE DIGITAL SIGNATURE DATA STRUCTURE WITH THE GROUP-BASED         │
│ COMMUNICATION OBJECT                                                        │
│                                    710                                      │
└─────────────────────────────────────────────────────────────────────────────┘
                                     ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  COMPUTE A HASH BASED ON THE GROUP-BASED COMMUNICATION OBJECT, CREATE A     │
│ VERIFICATION DIGITAL SIGNATURE BASED ON THE HASH; AND COMPARE THE           │
│ VERIFICATION DIGITAL SIGNATURE TO THE DIGITAL SIGNATURE DATA STRUCTURE      │
│                                    722                                      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                     ▼
┌─────────────────────────────────────────────────────────────────────────────┐
│ UPON VERIFYING AN IDENTIFY OF A DIGITAL SIGNATURE SIGNATORY ASSOCIATED WITH │
│ THE DIGITAL SIGNATURE SIGNATORY IDENTIFIER, GENERATE A VERIFIED SIGNATORY   │
│ INDICATOR                                                                   │
│                                    712                                      │
└─────────────────────────────────────────────────────────────────────────────┘
                                     ▼
┌─────────────────────────────────────────────────────────────────────────────┐
│ UPON VERIFYING AN INTEGRITY OF THE GROUP-BASED COMMUNICATION OBJECT,        │
│ GENERATE A VERIFIED INTEGRITY INDICATOR                                     │
│                                    714                                      │
└─────────────────────────────────────────────────────────────────────────────┘
                                     ▼
┌─────────────────────────────────────────────────────────────────────────────┐
│ UPON VERIFYING THE IDENTITY OF THE DIGITAL SIGNATURE SIGNATORY AND THE      │
│ INTEGRITY OF THE GROUP-BASED COMMUNICATION OBJECT, CREATE A LEGALLY BINDING │
│ STATEMENT DATA STRUCTURE BY ASSOCIATING THE VERIFIED SIGNATORY INDICATOR    │
│ AND THE VERIFIED INTEGRITY INDICATOR WITH THE GROUP-BASED COMMUNICATION     │
│ OBJECT AND THE DIGITAL SIGNATURE DATA STRUCTURE                             │
│                                    716                                      │
└─────────────────────────────────────────────────────────────────────────────┘
                                     ▼
┌─────────────────────────────────────────────────────────────────────────────┐
│ APPEND A DO-NOT-EDIT FLAG AND A DO-NOT-DELETE FLAG TO THE LEGALLY BINDING   │
│ STATEMENT DATA STRUCTURE                                                    │
│                                    718                                      │
└─────────────────────────────────────────────────────────────────────────────┘
```

FIG. 7

GENERATING A LEGALLY BINDING OBJECT WITHIN A GROUP-BASED COMMUNICATION SYSTEM

PRIORITY

This application is a continuation of and claims priority to U.S. patent application Ser. No. 16/942,302 filed Jul. 29, 2020 and issued as U.S. Pat. No. 11,431,505 on Aug. 30, 2022, which claims priority to U.S. Provisional Patent Application No. 62/880,286 filed Jul. 30, 2019, the entire contents of each are incorporated herein by reference.

BACKGROUND

Various messaging systems may support communication among users across one or more enterprises. In such systems, verifying that a communication from a user may be attributable to the user as a legally binding statement is a laborious and nuanced task. Applicant has identified a number of deficiencies and problems associated with such messaging systems. Through applied effort, ingenuity, and innovation, many of these identified problems have been solved by developing solutions that are included in embodiments of the present invention, many examples of which are described in detail herein.

BRIEF DESCRIPTION OF THE DRAWINGS

Reference will now be made to the accompanying drawings, which are not necessarily drawn to scale.

FIG. 5 illustrates a flow diagram of an exemplary method of facilitating a digital signature occurrence associated with a group-based communication object.

FIG. 6 illustrates a flow diagram of an exemplary method of facilitating a digital signature occurrence associated with a group-based communication object.

FIG. 7 illustrates a flow diagram of an exemplary method of facilitating a digital signature occurrence associated with a group-based communication object.

DETAILED DESCRIPTION

Figure 1A:
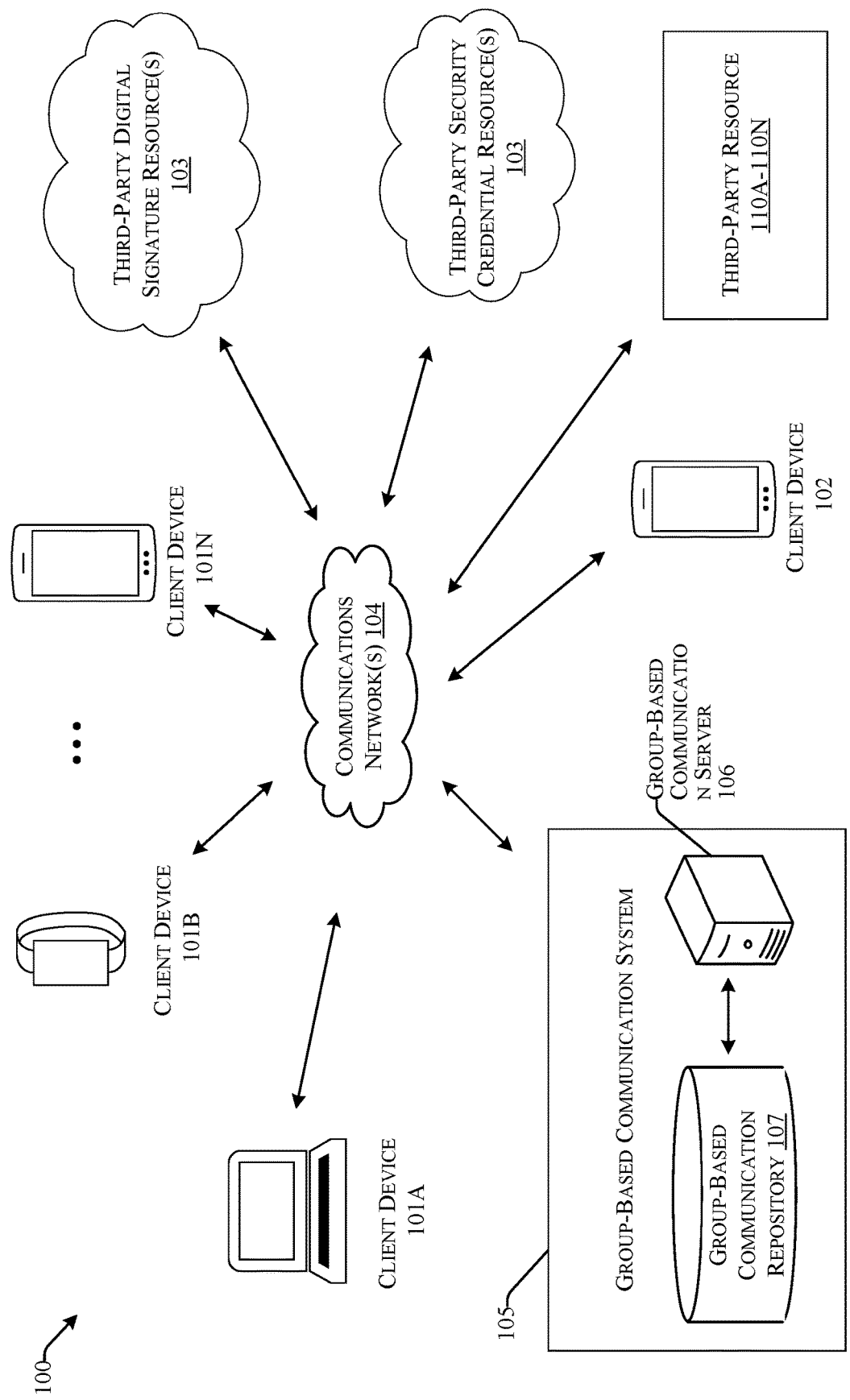
FIG. 1A illustrates an exemplary system architecture in accordance with some embodiments discussed herein.

This application describes techniques for facilitating a digital signature occurrence associated with an object transmitted via a communication channel associated with a group-based communication platform. In some embodiments, the group-based communication platform is a channel-based messaging platform. The object (e.g., group-based communication object) may include a collection of data and instructions that represent an item or resource of the group-based communication platform. For example, the object may include a message sent via the communication channel, a file attached to a message, or the like. The object may be created by a user within either the group-based communication platform or a third-party application and transmitted to one or more other users associated with the communication channel via the communication platform (e.g., server computing device associated with the communication platform). The communication platform may be configured to cause the object to be presented to the one or more other users via one or more group-based communication interfaces (e.g., user interfaces) associated with the communication channel.

In various embodiments, the user may additionally send an indication of intent to associate a digital signature with the object. In such embodiments, the indication of intent to associate the digital signature may represent an intent of the user to establish the object as a legally binding communication asserted on behalf of the user. In some embodiments, the user may request an authoritative affirmation of the object from the one or more other users associated with the channel, so as to establish the object as a legally binding communication asserted on behalf of the one or more other users.

In various embodiments, based at least in part on the indication of intent to associate the digital signature with the object, the communication platform may send a request to a third-party resource to verify the digital signature of the first user. In some embodiments, the third-party resource may provide the first user with digital signature data structure based at least in part on the request to verify the digital signature. The digital signature data structure may include a collection of data associated with a digital signature as well as a user identifier associated with the first user. In some embodiments, the digital signature data structure may include a public and/or a private key associated with the user.

In various embodiments, a computing device associated with the communication channel may receive the digital signature data structure from the first user and may cause the digital signature data structure to be presented via the communication channel in association with the object. In some embodiments, the communication platform may be configured to verify the identity of the first user and/or the integrity of the object. In some embodiments, the communication platform may verify the identity of the first user and/or the integrity of the object prior to associating the digital signature data structure with the object.

Accordingly, the present disclosure provides a technological improvement that results in verifying a digital signature prior to appending the digital signature to an object. In some embodiments, a verification may include verifying an identity of a digital signature signatory (e.g., user) and the integrity of the object with which the digital signature is associated within a group-based communication platform. In some embodiments, the present disclosure further provides technological improvements to monitoring and tracking digital signature occurrences within a group-based communication platform. For example, the communication platform may generate a report comprising verified digital signature occurrences (e.g., digital signature, creation, verification, and association with an object). Accordingly, the communication platform may easily monitor a frequency of valid digital signature occurrences associated with a particular communication channel.

In various embodiments, the present disclosure provides a technological improvement that results in ensuring that the user associated with a digital signature has control of the digital signature data structure associated with the digital signature. In various embodiments, a verified signature indicator may be generated and associated with the group-based communication object and the digital signature signatory upon verifying that the digital signature signatory is identical with the user identifier associated with the group-based communication object. In various embodiments, the present disclosure may verify that the user associated with the digital signature and the group-based communication object established the requisite intent to provide the digital signature and that the one or more users associated with the group-based communication object and/or group-based communication channel have consented to conduct a legally binding transaction electronically.

In various embodiments, the present disclosure provides a technological improvement of security in group-based messaging. By verifying a digital signature to be associated with a message, the techniques described herein may reduce instances of fraud in group-based communications, thereby increasing security thereof.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Exemplary System Architecture

Methods, systems, apparatuses, and computer program products of the present invention may be embodied by any of a variety of devices. For example, the method, system, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1A illustrates an example computing system 100 within which embodiments of the present disclosure may operate. Users may access a group-based communication system 105 (e.g., communication platform that facilitates communication and interaction between users in a group-based setting) via a communications network 104 using client devices 101A-101N. As used herein, the term group-based refers to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, objects, messages, etc., with specific groups.

The group-based communication system 105 may comprise a group-based communication server 106 in communication with at least one group-based communication repository 107. The group-based communication repository 107 may include a computing location where data is stored accessed, modified, and otherwise maintained by the communication platform. The stored data may include information that facilitates the operation of the communication platform. The group-based communication repository 107 may be embodied as a data storage device or devices, as a separate database server or servers, or as a combination of data storage devices and separate database servers. Further, in some embodiments, the group-based communication repository 107 may be embodied as a distributed repository such that some of the stored data is stored centrally in a location within the group-based communication system and other data stored in a single remote location or a plurality of remote locations. Alternatively, in some embodiments, the group-based communication repository 107 may be distributed over a plurality of remote storage locations.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the enterprise group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication (i.e. an object) may be transmitted by a client device 101A-101N to a group-based communication system 105. In various embodiments, the message or messaging communication may have associated therewith a timestamp. The timestamp may represent a network time associated with receipt of the message or messaging communication by the communication platform. In various embodiments, the timestamp may be analyzed to determine context regarding the message or messaging communication (e.g., the exact moment at which the message was sent in a communication channel). In various implementations, the message may be transmitted to the group-based communication system 105 over communications network 104 directly by a client device 101A-101N, the message may be transmitted to the group-based communication system 105 via an intermediary such as a message server, and/or the like. For example, the client device 101A-101N may be a desktop, a laptop, a tablet, a smartphone, and/or the like that is executing a client application (e.g., an enterprise group-based communication app). In one implementation, the message may include data such as a message identifier, sending user identifier (e.g., user associated with the creation and/or transmission of the message or messaging communication), a group identifier, a group-based communication channel identifier (e.g., unique identifier associated with a particular channel, ASCII text, pointer, memory address, etc.), message contents (e.g., text, emojis, images, links), attachments (e.g., files), message hierarchy data (e.g., the message may be a reply to another message), third-party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
      <user_name>ID_user_1</user_name>
      <password>abc123</password>
      //OPTIONAL <cookie>cookieID</cookie>
      //OPTIONAL   <digital_cert_link>www.mydigitalcertificate.com/JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <client_details> //iOS Client with App and Webkit
    //it should be noted that although several client details
    //sections are provided to show example variants of client
    //sources, further messages will include only on to save
    //space
    <client_IP>10.0.0.123</client_IP>
    <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
```

```
    <app_name>MSM.app </app_name>
    <app_version>1.0 </app_version>
    <app_webkit_name>Mobile Safari</client_webkit_name>
    <client_version>537.51.2</client_version>
  </client_details>
  <client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
policy.</contents>
    <attachments>patent_policy.pdf</attachments>
  </message>
</auth_request>
```

The group-based communication system 105 comprises at least one group-based communication server 106 that may create a storage message based upon the received message to facilitate message indexing and storage in a group-based communication repository 107. In one implementation, the storage message (i.e., a group-based communication message data structure) may include data such as a message identifier, a group identifier, a group-based communication channel identifier, a sending user identifier, topics, responses, message contents, attachments, message hierarchy data, third-party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
  <message_identifier>ID_message_10</message_identifier>
  <team_identifier>ID_team_1</team_identifier>
  <channel_identifier>ID_channel_1</channel_identifier>
  <sending_user_identifier>ID_user_1</sending_user_identifier>
  <topics>
    <topic>inventions</topic>
    <topic>patents</topic>
    <topic>policies</topic>
  </topics>
```

```
<responses>
  <response>liked by ID__user__2</response>
  <response>starred by ID__user__3</response>
</responses>
<contents>That is an interesting invention. I have attached a copy our
patent policy.</contents>
<attachments>patent_policy.pdf</attachments>
<conversation_primitive>
  conversation includes messages: ID__message__8, ID__message__9,
  ID__message__10, ID__message__11, ID__message__12
</conversation_primitive>
</storage_message>
```

In embodiments, a group identifier as defined above may be associated with the message or message communication.

In embodiments, a group-based communication channel identifier as defined above may be associated with the message or message communication.

In embodiments, a sending user identifier as defined above may be associated with the message or message communication. In one implementation, the message or message communication may be parsed (e.g., using PHP commands) to determine a sending user identifier of the user who sent the message or message communication.

In embodiments, topics may be associated with the message or message communication. In one implementation, the message or message communication contents may be parsed (e.g., using PHP commands) to determine topics discussed in the message or message communication. For example, hashtags in a message may indicate topics associated with the message. In another example, the message or message communication may be analyzed (e.g., by itself, with other messages in a conversation primitive) or parsed using a machine learning technique, such as topic modeling, to determine topics associated with the message or message communication.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third-party metadata may be associated with the message. For example, third-party metadata may provide additional context regarding the message or the user that is specific to a company, group, group-based communication channel, and/or the like. In one implementation, the message may be parsed (e.g., using PHP commands) to determine third-party metadata. For example, third-party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or perform other functions with respect to messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from messaging communication database). In one implementation, a storage message may be transmitted from the server to facilitate indexing in the messaging communication database. In another implementation, metadata associated with the message may be determined and the message may be indexed in the messaging communication database (e.g., group-based communication repository 107). In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the messaging communication repository 107 to facilitate searching. In one embodiment, the files may be indexed such that a company's or a group's files are indexed at a separate distributed database.

In embodiments of the present disclosure, a group-based communication system 105 enables the provision of a digital signature data structure to an associated client device via communications network 104 through the use of a third-party digital signature resource 103. The third-party digital signature resource 103 (e.g., third-party resource) may include a third-party digital signature management application provided by way of a remote networked device, such as a server or processing device, maintained by a third-party individual, company, or organization. A client device 101 associated with a group-based communication system 105 may access a third-party application provided by the third-party digital signature resource 103 to execute functions, flows, or actions associated with a digital signature data structure. In some embodiments, the functions, flows, or actions take effect within the third-party digital signature resource to produce an effect within the third-party digital signature resource 103. In various embodiments, the third-party digital signature resource may at least store one or more digital signature data structures associated with one or more user profiles. In various embodiments, a group-based communication server 106 may interact with a third-party digital signature resource 103 to transmit a digital signature data structure request signal associated with a digital signature execution request associated with a user identifier. In various embodiments, a client device 101 may interact with a third-party digital signature resource to receive a digital signature data structure associated with a user profile associated with the client device 101. In various embodiments, a group-based communication server 106 may interact with a third-party digital signature resource 103 to retrieve digital signature transaction data associated with each digital signature data structure associated with a digital signature occurrence.

Figure 1B:
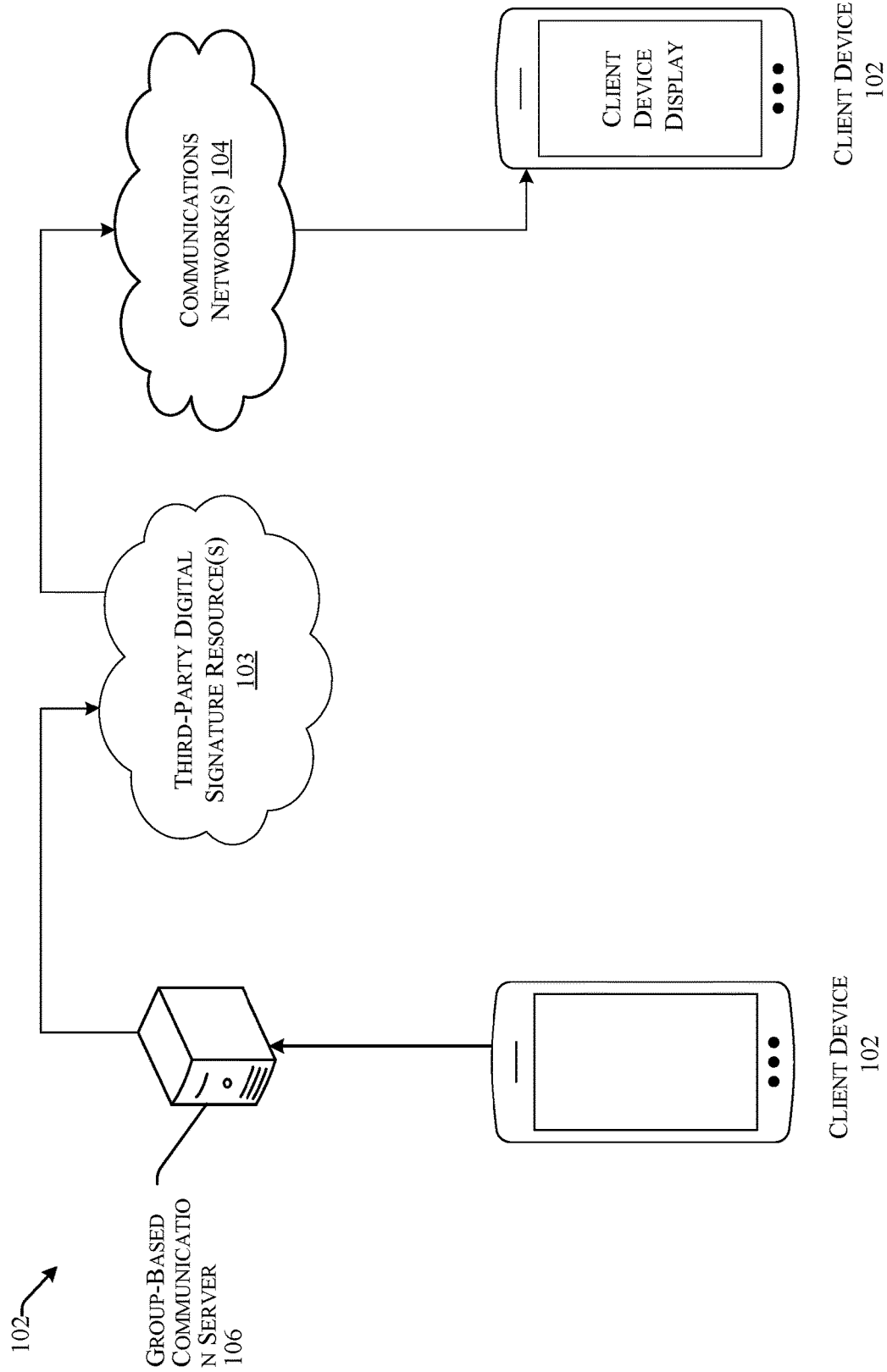
FIG. 1B illustrates an exemplary system configuration in accordance with some embodiments discussed herein.

Depicted in FIG. 1B, embodiments of the present disclosure further relate to provision of a digital signature data structure to an associated client device via communications network 104 through the use of a third-party digital signature resource 103. For example, in response to receiving a digital signature data structure request from a group-based communication server 106, a third-party digital signature resource 103 may transmit a digital signature data structure associated with a user profile associated with a client device 102 to the associated client device 102. The user profile (e.g., user account) may include information associated with a user, including, but not limited to a user identifier, one or more communication channel identifiers of which the user is a member, one or more group identifiers of which the user is a member, an indication as to whether the user is an owner of any of the communication channels, an indication as to whether the user has any communication channel restrictions, a plurality of messages, a plurality of emojis, a plurality of conversations, a plurality of conversation topics, a plurality of historical conversation primitives associated with the user profile, an avatar, an email address, a real name (e.g., John Doe), a username (e.g., j doe), a password, a real name, a time zone, a status, conversation segments associated with the user, metadata indicating historical messages with same conversation primitive shared with other user profiles, a digital signature data structure, and the like. In some embodiments, the user profile may include a subset designation of user credentials, such as, for example, login information for the user including the user's username and password.

Example Apparatuses for Implementing Embodiments of the Present Disclosure

Figure 2:
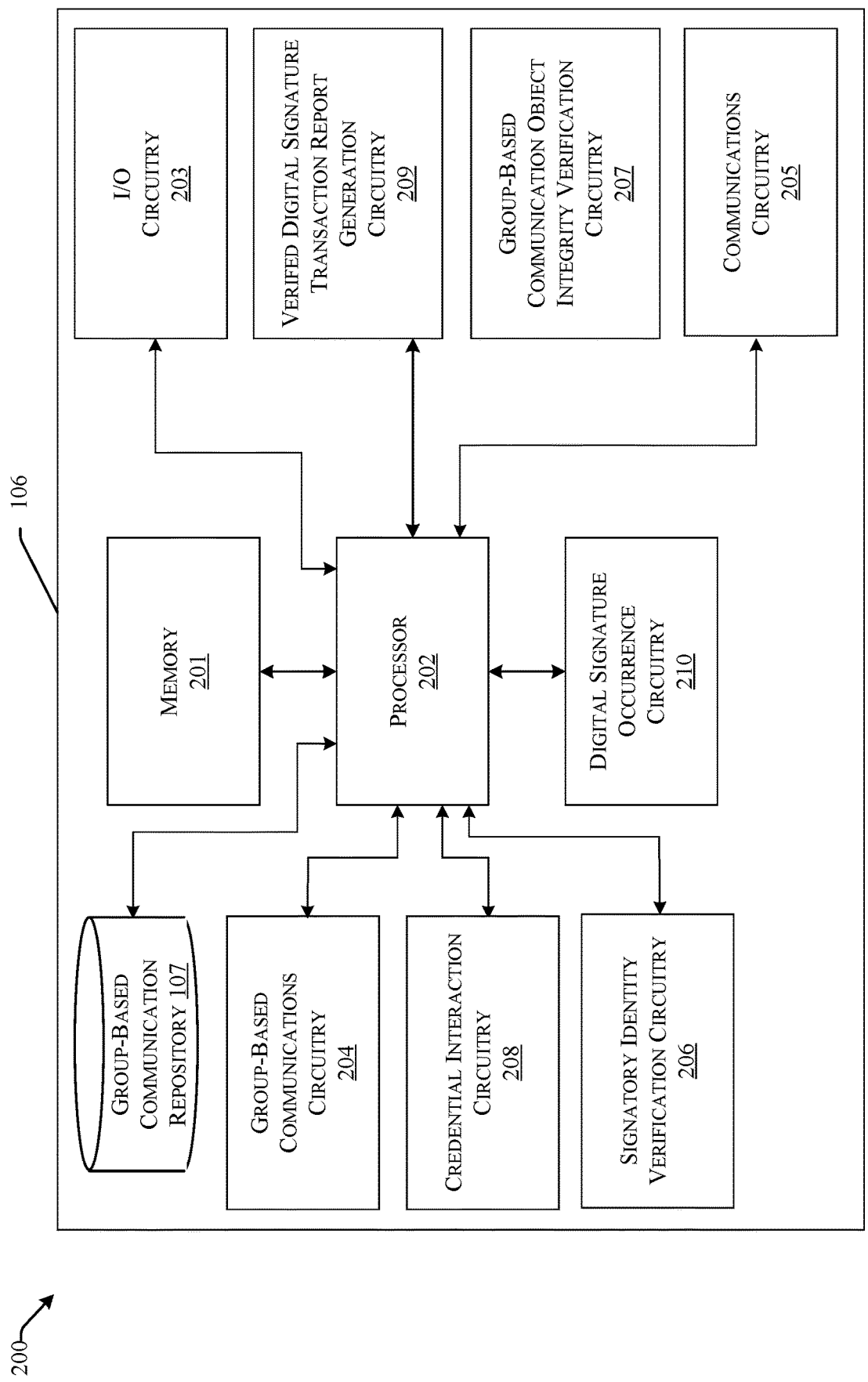
FIG. 2 illustrates exemplary apparatuses for implementing embodiments of the present disclosure.

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107, group-based communication circuitry 204, signatory verification identity circuitry 206, group-based communication object integrity verification circuitry 207, credential interaction circuitry 208, verified digital signature transaction report generation circuitry 209, and digital signature occurrence circuitry 210. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system 105. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. A group-based communication channel (e.g., communication channel) may include a virtual communications environment or feed that is configured to display messaging communications posted by channel members (e.g., validated users accessing the environment using client devices) that are viewable only to the members of the group. The group-based communication circuitry 204 may send and/or receive the digital content object via the communication channels, which may be presented the same or differently to different members of the group-based communication channel via different instances of group-based communication channel interfaces. It should also be appreciated that, in some embodiments, the group-based communication circuitry 204 may include a separate processor, specially configured field programmable gate array (FPGA), or application specific interface circuit (ASIC).

The signatory identity verification circuitry 206 may be any means such as a device or circuitry embodied in either hardware or a combination of hardware and software that is configured to verify the identity of a digital signature signatory as described herein. For example, in various embodiments, the signatory identity verification circuitry 206 may be configured to verify that the digital signature signatory identifier (e.g., signatory identifier) is associated with the first user profile and is identical to the first user identifier. The signatory identifier may include a user identifier that is associated with a digital signature data structure that is sent by a particular user (e.g., client device associated with a user identifier) to the group-based communication system.

Further, in various embodiments, the signatory identity verification circuitry 206 may be configured to analyze and/or verify whether the one or more security credential data packets transmitted from a first client device associated with a first user identifier and/or a second client device associated with a second user identifier have been successfully received and processed by the group-based communication server 106. In such a configuration, the signatory identity verification circuitry 206 may communicate with the credential interaction circuitry 208 to facilitate the verification by the group-based communication server 106 of the identity of a digital signature signatory. Further, in various embodiments, the signatory identity verification circuitry 206 may be configured to analyze and/or verify that a trust score constructed using a trust model and associated with one or more of the first user identifier, a digital signature signatory identifier, and the group-based communication channel identifier associated with the group-based communication object and/or interaction data associated with the digital signature data structure satisfies a pre-defined trust score threshold. The pre-defined trust score threshold may include base line value for determining whether a detected interaction activity (e.g., typing pattern, average typing speed, average download/upload data rate, downloading/uploading attachments associated with messages, drafting messages, sending messages, average download/upload data rate, search queries (e.g., words, phrases, symbols used, etc.), retrieving or exporting message content in a communication platform database, such as repository 107 (e.g., message content retrieval, exportation rate, etc.), network usage (e.g., public network, private network, VPN usage, etc.), biometric data associated with use of a client device 101 (e.g., fingerprint data for identifying a user, visual recognition data for identifying a user's face, audio recognition data for identifying a user's voice), etc.) meets a trust level defined by an administrator of the group-based communication system.

The trust score output by the trust model may be based at least in part on an aggregate of one or more impersonation detection parameters and/or an impersonation detection vector associated with one or more of the first user identifier, the digital signature signatory identifier, and the group-based communication channel identifier. In various embodiments, the apparatus 200 described herein may be configured to generate a trust score, such as one described in U.S. Provisional Patent No. 62/880,550, entitled METHOD, APPARATUS AND COMPUTER PROGRAM PRODUCT FOR PROVIDING IDENTITY VERIFICATION WITHIN A GROUP-BASED COMMUNICATION SYSTEM, and filed on Jul. 30, 2019, which is incorporated herein by reference in its entirety. In some embodiments, the trust score may be generated based on a function associated with an impersonation detection vector. In some examples, the trust score may be generated by capturing multiple features of an interaction activity to determine a trust level of the interaction activity. The trust score may be updated or modified after a verification process that is initiated when the original trust score is lower than a pre-defined trust score threshold for the interaction activity. The verification process is initiated for further identity verification to obtain additional information for determining whether an unusual interaction activity occurred. The trust score may be updated after the verification process is completed and the update may be based on the verification result of the verification process.

In various embodiments, the trust model may comprise a machine learning model that provides a trust score associated with one or more of the first user identifier, a digital signature signatory identifier, and the group-based communication channel identifier. In such examples, the trust model may be trained utilizing a training dataset (e.g., a set of examples used to fit the parameters of the trust model). The trust model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network).

In at least one embodiment, the training dataset may include impersonation detection parameters and/or impersonation detection vectors. An impersonation detection parameter may include electronic data extracted from interaction data received from a client device associated with a particular user, where the impersonation detection parameter represents features of an interaction activity represented by the interaction data. The impersonation detection parameters may be associated with a first user identifier associated with a first user, a signatory identifier associated with a digital signature data structure, a channel identifier associated with a communication channel, or one or more data structures associated with one or more objects previously transmitted via the communication channel.

In some examples, the impersonation detection parameters may include historical data collected in the past and based on historical interaction activities similar to the current interaction activity received. The historical impersonation detection parameters are associated with a user profile for the particular user and are stored within a group-based communication repository. The historical impersonation detection parameters serve as basis for determining unusual interaction activities by comparing a respective interaction activity feature of current interaction activity with a historical respective interaction activity feature captured from similar interaction activities in history. An impersonation detection vector may include a data structure comprising a plurality of impersonation detection vector records of electronic data such that the vector is configured to assist in detecting an unusual or malicious interaction activity based on current detected interaction data and historically detected interaction data. In embodiments, the impersonation detection vector is generated by comparing impersonation detection parameters extracted from the current interaction data with historical impersonation detection parameters that are associated with a user profile and retrieved from a group-based communication database. The impersonation detection vector captures a plurality of features of an interaction activity and utilizes those features captured in multiple dimensions as a whole to determine whether there is an unusual or malicious interaction activity occurred.

Further, the signatory identity verification circuitry 206 may be configured to, upon verifying the identity of the digital signature signatory, generate a verified signatory indicator (e.g., signatory indicator). The verified signatory indicator may include data associated with a digital signature data structure and/or an object identifier that is associated with a user identifier and that indicates that the identity of the signatory has been verified (i.e., that the digital signature was executed by the user associated with the digital signature). The verified signatory indicator may be associated with at least the first user identifier, the first user profile, the group-based communication object identifier, the group-based communication channel identifier, a legally binding statement data structure, and/or the digital signature data structure. In some embodiments, a signatory indicator may be associated with the object identifier and/or the digital signature data structure based at least in part on a determination that the digital signature signatory identifier matches a user identifier associated with the user, such as that stored in a user profile. In such embodiments, the communication platform may determine the user identifier stored in the user profile and compare the user identifier to the signatory identifier to verify an identity of the digital signature signatory (e.g., based on a match of the signatory identifier and the user identifier). In some embodiments, the communication platform may determine the match based on a difference between the signatory identifier and the user identifier being less than a threshold difference.

In various embodiments, the verified signatory indicator may be associated with a requested signatory identifier (e.g., identifier associated with user whose digital signature has been requested in an authenticated group-based communication object request). For example, a verified signatory indicator may be a data structure comprising a flag, or a record of a data structure whereby a logic "1" indicates completion and a logic "0" indicates the verification of the identity of the digital signature signatory has not been completed. In various embodiments, the verified signatory indicator may be rendered for display within a group-based communication channel interface with which it is associated, such as within an object proximate the digital signature data structure or within a group-based communication channel interface proximate the object. In various embodiments, a verified signatory indicator may be permanently associated with a group-based communication object and a digital signature data structure to create a legally binding statement data structure such that the group-based communication object defines a legally binding statement associated with a user. The legally binding statement data structure may include a collection of data indicating intent of a user to be legally responsible for data associated with a digitally signed object. In various embodiments, a verified signatory indicator may be further associated with a legally binding statement data structure.

Further, the signatory identity verification circuitry 206 may be configured to, upon attempting and failing to verify the identity of the digital signature signatory, generate an invalid signature indicator (e.g., indication of invalidity). In various embodiments, the invalid signature indicator may represent that a particular digital signature occurrence has been completed, but that one or both of the identity of the digital signature signatory and the integrity of the group-based communication object could not be verified. The invalid signature indicator may be associated with at least the digital signature data structure, the digital signature signatory identifier, digital signature occurrence identifier, the group-based communication object identifier, the group-based communication object, and/or the group-based communication channel identifier. In various embodiments, the invalid signature indicator may be rendered for display within the group-based communication object proximate a digital signature data structure or within a group-based communication channel interface proximate a group-based communication object. In at least one example, the invalid signature indicator may be presented on a display of a client device associated with the signatory (e.g., user who indicated an intent to associate a digital signature with an object). The signatory identity verification circuitry 206 may utilize processing circuitry, such as the processor 202, to perform these actions. It should also be appreciated that, in some embodiments, the signatory identity verification circuitry 206 may include a separate processor, specially configured field programmable gate array (FPGA), or application specific interface circuit (ASIC).

The group-based communication object integrity verification circuitry 207 may be any means such as a device or circuitry embodied in either hardware or a combination of hardware and software that is configured to verify the integrity of a group-based communication object as described herein. As used herein, the integrity of an object represents an attribute associated with the object that comprises a data structure identical to that which it comprised at a previous moment in time (e.g., when the object was digitally signed). For example, in various embodiments, the group-based communication object integrity verification circuitry 207 may be configured to verify that at a second timestamp the group-based communication object received by the apparatus at a first timestamp is identical to (1) the group-based communication object at a digital signature occurrence timestamp (e.g., network time associated with at least one of the commencement, conclusion, or run time of a digital signature occurrence, moment associated with transmission from a client device to the communication platform, etc.) and (2) the group-based communication object at the second timestamp (e.g., time associated with receipt of the object by the communication platform). In other words, the group-based communication object integrity verification circuitry 207 may be configured to determine that a first state of the object at a first timestamp associated with a transmission of the object matches a second state of the object at a second timestamp associated with receipt of the object by the communication platform (e.g., server computing device). In some embodiments, the match may be determined based on a difference between the first state and the second state being less than a threshold difference.

Further, in various embodiments, as described herein, the group-based communication object integrity verification circuitry 207 may be configured to analyze and/or verify whether the one or more security credential data packets transmitted from a first client device associated with a first user identifier and/or a second client device associated with a second user identifier have been successfully received and processed by the group-based communication server 106. In such a configuration, the group-based communication object integrity verification circuitry 207 may communicate with the credential interaction circuitry 208 to facilitate the verification by the group-based communication server 106 of the integrity of the group-based communication object.

Further, in various embodiments, the group-based communication object integrity verification circuitry 207 may be configured to analyze and/or verify that a trust score associated with one or more of the first user identifier, a digital signature signatory identifier, and the group-based communication channel identifier associated with the group-based communication object and/or interaction data associated with the digital signature data structure satisfies a pre-defined trust score threshold. The pre-defined trust score threshold may include base line value for determining whether a detected interaction activity meets a trust level defined by an administrator of the group-based communication system. The pre-defined trust score threshold may be defined by the administrator based on the type of interaction activity initiated by a user. For example, in circumstances where the interaction activity is related to a user accessing a public network using a client device, the pre-defined trust score threshold may bet set by the administrator to have a high value. For another example, in circumstances where the interaction activity is related to a user accessing a private network or a VPN using a client device, the pre-defined trust score threshold may be set by the administrator to have a low value, since data transmitted via the private network or the VPN generally has higher security protection.

Further, the group-based communication object integrity verification circuitry 207 may be configured to, upon verifying the integrity of the group-based communication object, generate a verified integrity indicator (e.g., integrity indicator). The verified integrity indicator may be associated with at least the group-based communication object identifier, the group-based communication channel identifier, a legally binding statement data structure, and/or the digital signature data structure. The integrity indicator may represent that the integrity of the object has been verified (i.e., that the object has not been altered). In various embodiments, the verified integrity indicator may be associated with an object identifier based on a determination that the first state of the object at the first matches (e.g., is within a threshold difference of) the second state of the object at the second timestamp. For example, the verified integrity indicator may include a data structure comprising a flag, or a record of a data structure whereby a logic "1" indicates completion and a logic "0" indicates the verification of the integrity of the group-based communication has not been completed.

In various embodiments, the verified integrity indicator may be rendered for display within a group-based communication object and/or within a group-based communication channel interface proximate the group-based communication object with which it is associated. IN various embodiments, a verified integrity indicator may be permanently associated with a group-based communication object and a digital signature data structure to create a legally binding statement data structure such that the group-based communication object defines a legally binding statement associated with a user. In various embodiments, a verified integrity indicator may be further associated with a legally binding statement data structure.

Further, the group-based communication object integrity verification circuitry 207 may be configured to, upon attempting and failing to verify the integrity of the group-based communication object, generate an invalid signature indicator. The invalid signature indicator may be associated with at least the digital signature data structure, the digital signature signatory identifier, the group-based communication object identifier, and/or the group-based communication channel identifier. In various embodiments, the invalid signature indicator may be rendered for display within a group-based communication channel interface with which it is associated. The group-based communication object integrity verification circuitry 207 may utilize processing circuitry, such as the processor 202, to perform these actions. The group-based communication object integrity verification circuitry 207 may send and/or receive data from the group-based communication repository 107. It should also be appreciated that, in some embodiments, the group-based communication object integrity verification circuitry 207 may include a separate processor, specially configured field programmable gate array (FPGA), or application specific interface circuit (ASIC).

The credential interaction circuitry 208 may be any means such as a device or circuitry embodied in either hardware or a combination of hardware and software that is configured to facilitate one or more encryption and/or decryption processes. The credential interaction circuitry 208 may be configured to generate, transmit, and/or receive one or more of signals, requests, and/or data from either one or both of one or more client devices and a third-party security credential resource 108 as described herein. The third-party security credential resource 108 may include a third-party security credential management application provided by way of a remote networked device, such as a server or processing device, maintained by a third-party individual, company, or organization. A client device 101 in a group-based communication system may access a third-party application provided by a third-party security credential resource to execute functions, flows, or actions associated with a security credential data packet. In some embodiments, the functions, flows, or actions take effect within the third-party security credential resource to produce an effect within the third-party security credential resource 108. In various embodiments, the third-party security credential resource 108 may at least generate and/or store one or more security credential data packets associated with one or more user profiles. In various embodiments, as a non-limiting example, the third-party security credential resource may comprise a security credential generation engine and a security credential repository.

In various embodiments, the credential interaction circuitry 208 may be configured to generate, transmit, and/or receive a hash based on a group-based communication object, create, transmit, and/or receive a verification digital signature based on the hash, and compare the verification digital signature to a digital signature data structure in order to execute one or both of an encryption and a decryption process. In various embodiments, the verification digital signature may be associated with a sending user identifier associated with the group-based communication object. In various embodiments, for example, the verification digital signature may comprise a private key associated with the sending user identifier. In various embodiments, the verification digital signature may be compared to a digital signature data structure in order to execute one or both of an encryption and a decryption process with respect to either one or both of the group-based communication object and the digital signature data structure. In various embodiments, one or both of the hash and the verification digital signature associated with the group-based communication object may be associated with the group-based verified digital signature transaction report such that at least a portion of the process by which the verification digital signature was created may be included in the group-based verified digital signature transaction report.

In various embodiments, the credential interaction circuitry 208 may be configured to facilitate the execution of a cryptographically secured digital signature transaction, such as, for example, a PGP signature transaction, or any other security credential (e.g., public/private key) transmittal for the purposes of encryption/decryption and/or verification/authentication. In various embodiments, the credential interaction circuitry 208 may be configured to facilitate a public key infrastructure. Further, in various embodiments, as non-limiting examples, the credential interaction circuitry 208 may be configured to associate a security credential request signal with one or more client devices. The security credential request signal may include a security credential request. The security credential request may comprise instructions for a third-party security credential resource 108 to transmit one or more security credential data packets to one or more client devices associated with a group-based communication object received by the group-based communication message. In various embodiments, the security credential request may be associated with a user identifier, a user profile, an organization identifier, an organization profile, a client device, a group-based communication channel identifier, a digital signature occurrence, and/or a digital signature data structure.

In some embodiments, the credential interaction circuitry 208 may be configured to transmit one or more security credential request signals to third-party security credential resource 108. In various embodiments, upon receiving a security credential request from a group-based communication server 106, the third-party security credential resource 108 may be configured to transmit one or more security credential data packets associated with the security credential request and the one or more user identifiers to the one or more client devices 101 associated with the one or more user identifiers. The security credential data packet may include data associated with a user identifier, client device, and/or a communication channel. The security credential data packet may be used to provide access to and/or decrypt a group-based communication object. In various embodiments, one or more security credential data packets may comprise, for example, a password, a public key, a private key, and the like. In various embodiments, a first security credential data packet may exclusively correspond to a second security credential data packet so as to facilitate, for example, a PGP signature functionality. In various embodiments, the group-based communication server may be configured to receive one or more security credential data packets from one or more client devices.

In various embodiments, the credential interaction circuitry 208 may receive one or more security credential data packet from one or more client devices, and/or receive a third-party security credential resource activity data packet from the third-party security credential resource 108. In various embodiments, the credential interaction circuitry 208 may communicate with both the signatory identity verification circuitry 206 and the group-based communication object integrity verification circuitry 207 to facilitate the verification by the group-based communication server 106 of one or both of the digital signature signatory identity and the group-based communication object integrity by facilitating the execution of a cryptographically secured digital signature transaction, for example, via public-key cryptography, or any other security credential (e.g., public/private key) transmittal for the purposes of encryption/decryption and/or verification/authentication. The credential interaction circuitry 208 may utilize processing circuitry, such as the processor 202, to perform these actions. It should also be appreciated that, in some embodiments, the credential interaction circuitry 208 may include a separate processor, specially configured field programmable gate array (FPGA), or application specific interface circuit (ASIC).

The verified digital signature transaction report generation circuitry 209 may be any means such as a device or circuitry embodied in either hardware or a combination of hardware and software that is configured to generate a group-based verified digital signature transaction report (e.g., digital signature transaction report) as described herein. The digital signature transaction report may include a collection of data associated with a digital signature occurrence that is aggregated for the purpose of transmitting to one or more client devices associated with a group-based communication channel. In some embodiments, the digital signature transaction report may include information associated with the process by which the digital signature data structure was created. In some embodiments, the digital signature transaction report may have associated therewith a digital signature occurrence indicator and/or a digital signature occurrence identifier. In some embodiments, the digital signature occurrence indicator may indicate that a particular digital signature occurrence has been completed. The digital signature occurrence indicator may include a textual or graphical statement generated as proof that a group-based communication object was executed with an electronic (e.g., digital) signature. In various embodiments, the apparatus 200 may generate the digital signature occurrence indicator responsive to determining that the identity of the signatory and integrity of the object have been verified.

In various embodiments, the group-based verified digital signature transaction report may be associated with a user identifier, a legally binding statement data structure, a group-based communication object identifier, a digital signature data structure, a digital signature occurrence data structure (e.g., data associated with a digital signature occurrence), a digital signature occurrence identifier (e.g., unique identifier that identifies a particular digital signature occurrence), signatory indicator, integrity indicator, and the group-based communication object. In various embodiments, the group-based verified digital signature transaction report may comprise at least a portion of a group-based communication system data corpus associated with the digital signature data structure. For example, an authenticated group-based communication object request (e.g., instructions requesting that the user identifier associated with a requested signatory identifier transmit a digital signature data structure associated with the user's user profile to the group-based communication server to be associated with an object) may be created by a user associated with the group-based communication channel that has a threshold number of additional digital signature authenticators. The group-based verified digital signature transaction report may comprise data associated with an authenticated group-based communication object confirmation request data and confirmed authenticated group-based communication object confirmation data.

In various embodiments, the group-based verified digital signature transaction report may be further associated with a hash and/or a verified digital signature associated with the group-based communication object. with the group-based communication object. In various embodiments, the group-based verified digital signature transaction report may further comprise data associated with any computing errors (i.e., "bugs") that arose during the digital signature occurrence. The verified digital signature transaction report generation circuitry 209 may utilize processing circuitry, such as the processor 202, to perform these actions. The verified digital signature transaction report generation circuitry 209 may send and/or receive data from the group-based communication repository 107.

In various embodiments, the verified digital signature transaction report generation circuitry 209 may cause the digital signature transaction report to be rendered on one or more client devices associated with the communication channel. In such embodiments, the digital signature transaction report may be associated with the communication channel. In some embodiments, the digital signature transaction report may be rendered on a display associated with the user device corresponding to the digital signature signatory (e.g., first user). In various embodiments, the digital signature transaction report may be rendered via a digital signature transaction report interface. The digital signature transaction report interface may be accessible via a client device and may include a virtual environment configured to render a group-based verified digital signature transaction report within a group-based communication system and facilitate user interaction with the rendered group-based verified digital signature transaction report. In various embodiments, the digital signature transaction report interface may be accessible and viewable to a user associated with the digital signature data structure.

In various embodiments, the verified digital signature transaction report generation circuitry 209 may cause the transaction report in a database, such as the group-based communication repository 107. It should also be appreciated that, in some embodiments, the verified digital signature transaction report generation circuitry 209 may include a separate processor, specially configured field programmable gate array (FPGA), or application specific interface circuit (ASIC).

The digital signature occurrence circuitry 210 may be any means such as a device or circuitry embodied in either hardware or a combination of hardware and software that is configured to receive a digital signature execution request. In various embodiments, the digital signature execution request may include an indication of intent to associate a digital signature with an object. A digital signature execution request may be associated with a user identifier, a digital signature data structure, a group-based communication object identifier, and/or a digital signature occurrence identifier. In various embodiments, responsive to receiving the digital signature execution request, the digital signature occurrence circuitry 210 may generate a digital signature data structure request (e.g., request to verify the digital signature) associated with the digital signature execution request to be transmitted to a third-party digital signature resource as described herein. The digital signature data structure request may include a user identifier, a client device, and/or a digital signature data structure associated with the digital signature. In some embodiments, the digital signature occurrence circuitry 210 may send the request to verify the digital signature to a computing device associated with the third-party digital signature resource. In some embodiments, the digital signature occurrence may have associated therewith the digital signature execution request.

Further, in various embodiments, the digital signature occurrence circuitry 210 may be configured to transmit a digital signature consent verification data packet to a client device and receive a confirmed digital signature consent verification data packet from the client device so as to confirm a user's affirmative intent and consent to conduct business electronically. Further, in various embodiments, the digital signature occurrence circuitry 210 may be configured to receive a digital signature data structure associated with the digital signature data structure request from a client device and associate the digital signature data structure with the group-based communication object. Further, in various embodiments, the digital signature occurrence circuitry 210 may be configured to verify that, at or around a timestamp subsequent a digital occurrence timestamp, the one or more user profiles associated with the one or more user identifiers associated with a digital signature occurrence have associated therewith a confirmed digital signature consent verification data packet and/or an electronic transaction consent indicator, so as to verify that the one or more parties associated with the digital signature occurrence have consented and intended to conduct business electronically and have not withdrawn said consent. In various embodiments, the digital signature occurrence circuitry 210 may communicate with credential interaction circuitry 208 to facilitate the verification by the group-based communication server 106 of one or both of the digital signature signatory identity and the group-based communication object integrity by facilitating the execution of a cryptographically secured digital signature transaction, for example, via public-key cryptography, or any other security credential (e.g., public/private key) transmittal for the purposes of encryption/decryption and/or verification/authentication. The digital signature occurrence circuitry 210 may utilize processing circuitry, such as the processor 202, to perform these actions. The digital signature occurrence circuitry 210 may send and/or receive data from the group-based communication repository 107. It should also be appreciated that, in some embodiments, the verified digital signature transaction report generation circuitry 209 may include a separate processor, specially configured field programmable gate array (FPGA), or application specific interface circuit (ASIC).

As described herein, the digital signature occurrence may comprise receipt of the digital signature execution request from a client device, transmission of a digital signature data structure request to a third-party digital signature resource, receipt of a digital signature data structure from the client device, and an association of the digital signature data structure with a group-based communication object. In various embodiments, a digital signature occurrence may further comprise a transmission of a digital signature consent verification packet to a client device and subsequent receipt of a confirmed digital signature consent verification packet from the client device. In embodiments, a digital signature occurrence may represent an electronic version of a live, in-person signing of a document or affirmation of a statement by a user. For example, a group-based communication system may, within a group-based communication server, selectively associate a digital signature data structure associated with a user identifier with a group-based communication object.

Facilitating a Digital Signature Occurrence

FIGS. 3-9 illustrate example processes in accordance with embodiments of the disclosure. These processes are illustrated as logical flow graphs, each operation (e.g., block) of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 3:
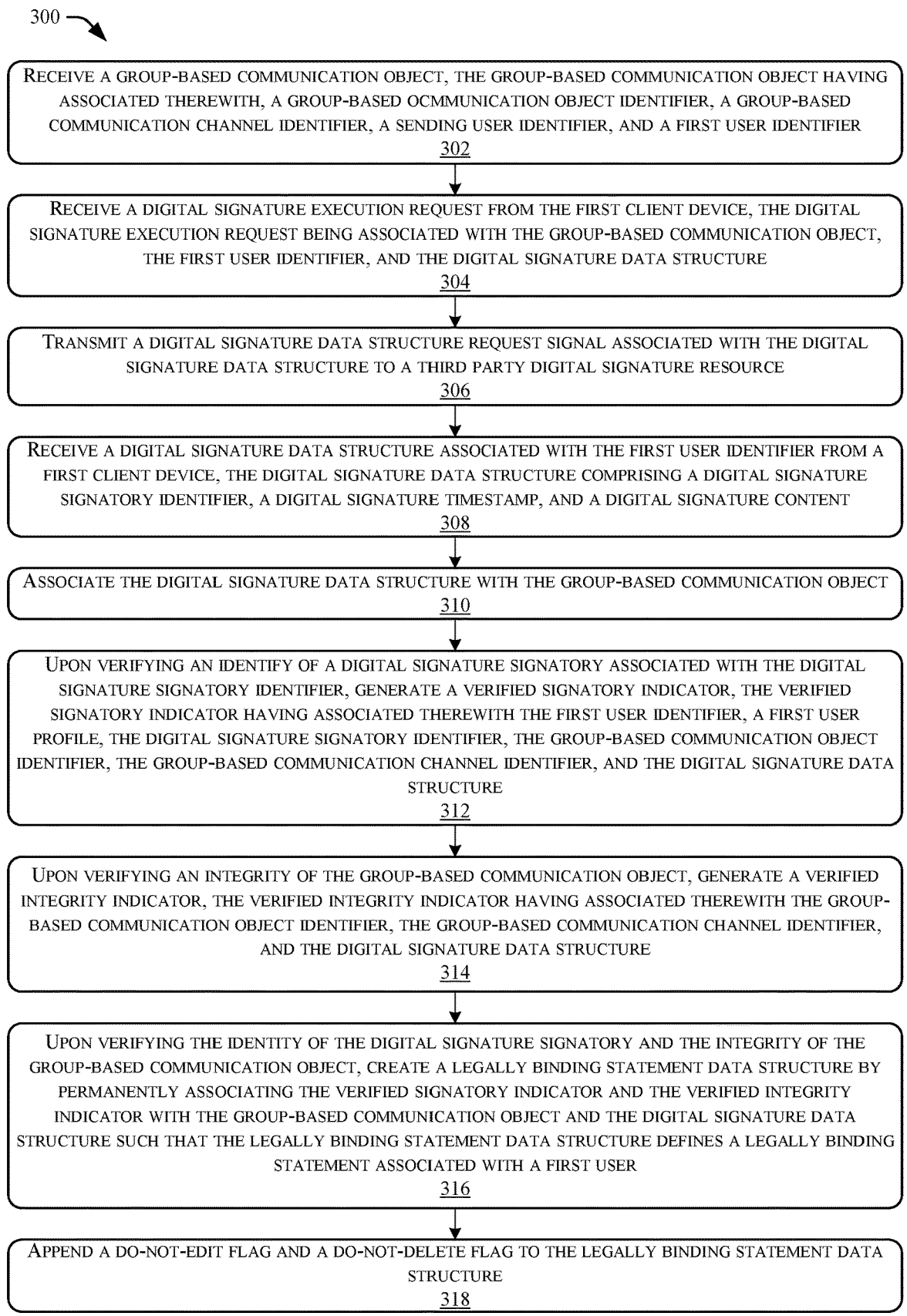
FIG. 3 illustrates a flow diagram of an exemplary method of facilitating a digital signature occurrence associated with a group-based communication object.

FIG. 3 illustrates a flow diagram of an example method 300 in accordance with some embodiments discussed herein.

At block 302, the group-based communication server 106 is configured to receive a group-based communication object (e.g., object). In various embodiments, the objects may include files created and maintained in the group-based communication system, files linked or uploaded to the group-based communication system, user accounts, emojis posted in a group-based communication channel, emojis available in a group-based communication channel, metadata associated with group-based communication messages (e.g., any electronically generated digital content (e.g., text, image, video, audio, combination thereof, etc.) provided by a user that has security sufficient that it is accessible only to a defined group of users and that is configured for display within a communication channel) such as an author identifiers (e.g., user identifier associated with a user responsible for drafting a message and/or object), a post timestamp (e.g., digital representation of a network time associated with posting a message, object, or the like via the communication platform), a channel identifier, user identifiers of users with access rights to the group-based communication message, group-based communication channels, user profile identifiers, indications of user profiles (such as pointers with reference to user profiles), and the like. In some embodiments, the object may have associated therewith a group-based communication object identifier (e.g., identifier that uniquely identifies a particular object in the communication platform and/or an object type (e.g., category of object)), a group-based communication channel identifier, a sending user identifier, and/or a first user identifier (e.g., organization identifier). The group-based communication object may be received from either a client device 102 or one of a plurality of client devices 101A-101N. As described herein, actions described with respect to the client device 102 may be alternatively performed by one of the plurality of client devices 101A-101N.

After the group-based communication server 106 receives the group-based communication object from the client device 102, at 304, the server 106 is configured to receive a digital signature execution request (e.g., an indication of intent to associate a digital signature of the first user with the object) from the client device 102. In various embodiments, the digital signature execution request may be associated with the group-based communication object, the first user identifier, and a digital signature data structure. In various embodiments, the first user identifier may be associated with a first organization identifier, and the first organization identifier may be associated with an organization profile. In various embodiments, the organization profile may be associated with one or more client devices, the one or more client devices comprising the first client device 102, and the group-based communication channel identifier.

After the group-based communication server 106 receives a digital signature execution request from a client device 102, at 306, the server 106 may be configured to transmit a digital signature data structure request signal associated with the digital signature data structure (e.g., a request to verify the digital signature of the first user) to a third-party digital signature resource 103. In various embodiments, wherein the client device 102 is configured to store and/or generate a digital signature data structure associated with the user identifier associated with the client device 102, the group-based communication server 106 may be configured to transmit a digital signature data structure request to the client device 102. In various embodiments, the digital signature data structure request signal may be associated with at least one or more of the first client device 102, the first user identifier, the group-based communication object, and the digital signature data structure.

After the group-based communication server 106 transmits the digital signature data structure request signal to the third-party digital signature resource 103, at 308, the server 106 is configured to receive the digital signature data structure associated with the first user identifier from the first client device 102, the digital signature data structure comprising a digital signature signatory identifier, a digital signature timestamp (e.g., network time associated with the creation of a digital signature data structure), and digital signature content (e.g., data associated with a digital signature data structure, such as text, emojis, and/or images collectively intended to visually represent the actual signature of a user). In various embodiments, the digital signature data structure may be provided to the first client device by the third-party digital signature resource 103 based at least in part on the request to verify the digital signature of the first user. The digital signature data structure may include a signatory identifier associated with the first user.

In various embodiments, the digital signature data structure may comprise an image created by a user with the intent that the image would represent a digital signature. In various embodiments, the first user identifier is associated with the first user profile, and the first user profile is associated with the digital signature data structure. The first user identifier may be associated with access rights to a group-based communication channel associated with the group-based communication channel identifier. In various embodiments, the group-based communication channel may comprise a private group-based communication channel. The private group-based communication channel may include a communication channel with restricted access such that it is not generally accessible and/or searchable by other members of the group-based communication platform. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel. In various embodiments, a private group-based communication channel may be associated with a group-based communication channel identifier that is unique to private communication channels.

After the group-based communication server 106 receives the digital signature data structure associated with the first user identifier from the first client device 102, at 310, the server 106 may be configured to associate the digital signature data structure with the group-based communication object. In various embodiments, the group-based communication server 106 may cause the digital signature data structure to be presented with the object in association with the communication channel on a first display associated with the first client device of the user and a second display associated with a second client device of a second user, the second user being associated with the group-based communication channel.

After the group-based communication server 106 associates the digital signature data structure with the group-based communication object, at 312, the server 106 may be configured to, upon verifying an identity of a digital signature signatory associated with the digital signature signatory identifier, generate a verified signatory indicator. In various embodiments, the verified signatory indicator may have associated therewith the first user identifier, a first user profile, the digital signature signatory identifier, the group-based communication object identifier, the group-based communication channel identifier, and the digital signature data structure. In various embodiments, the group-based communication server 106 may be configured to verify the identity of the digital signature signatory associated with the digital signature signatory identifier by verifying that the digital signature signatory identifier (e.g. signatory identifier associated with the digital signature data structure) is associated with the first user profile and is identical to the first user identifier. In various embodiments, the group-based communication server 106 may be configured to verify the identity of the digital signature signatory associated with the digital signature signatory identifier by using a trust model. In various embodiments, the trust model may comprise a machine learning model that provides a trust score associated with one or more of the first user identifier, a digital signature signatory identifier, and the group-based communication channel identifier. In such examples, the trust model may be trained utilizing a training dataset (e.g., a set of examples used to fit the parameters of the trust model). The trust model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network).

In at least one embodiment, the training dataset may include impersonation detection parameters and/or impersonation detection vectors. An impersonation detection parameter may include electronic data extracted from interaction data received from a client device associated with a particular user, where the impersonation detection parameter represents features of an interaction activity represented by the interaction data. In some examples, the impersonation detection parameters may include historical data collected in the past and based on historical interaction activities similar to the current interaction activity received. The historical impersonation detection parameters are associated with a user profile for the particular user and are stored within a group-based communication repository. The historical impersonation detection parameters serve as basis for determining unusual interaction activities by comparing a respective interaction activity feature of current interaction activity with a historical respective interaction activity feature captured from similar interaction activities in history. An impersonation detection vector may include a data structure comprising a plurality of impersonation detection vector records of electronic data such that the vector is configured to assist in detecting an unusual or malicious interaction activity based on current detected interaction data and historically detected interaction data. In embodiments, the impersonation detection vector is generated by comparing impersonation detection parameters extracted from the current interaction data with historical impersonation detection parameters that are associated with a user profile and retrieved from a group-based communication database. The impersonation detection vector captures a plurality of features of an interaction activity and utilizes those features captured in multiple dimensions as a whole to determine whether there is an unusual or malicious interaction activity occurred.

The trust score output by the trust model may be based at least in part on an aggregate of one or more impersonation detection parameters and/or an impersonation detection vector associated with one or more of the first user identifier, the digital signature signatory identifier, and the group-based communication channel identifier. In various embodiments, the one or more group-based communication system data structures may be related to previous group-based communication activity. In various embodiments, the verified signatory indicator may be rendered for display within a group-based communication object proximate the digital signature data structure or within a group-based communication channel interface proximate a group-based communication object. The group-based communication channel interface (e.g., interface associated with the communication channel) may be one of many group-based communication interfaces associated with the communication platform. As described herein, the interfaces may refer to a virtual communications environment configured to facilitate user interaction via the communication platform. Each interface may be accessible and viewable to a select group of users, such as a group of employees of a business or organization.

After the group-based communication server 106 generates a verified signatory indicator associated with the first user identifier, a first user profile, the digital signature signatory identifier, the group-based communication object identifier, the group-based communication channel identifier, and the digital signature data structure associated therewith, at 314, the server 106 may be configured to, upon verifying an integrity of the group-based communication object, generate a verified integrity indicator. In various embodiments, the verified integrity indicator may have associated therewith the group-based communication object identifier, the group-based communication channel identifier, and the digital signature data structure. In various embodiments, the group-based communication server 106 may be configured to verify the an integrity of the group-based communication object by verifying at a second timestamp the group-based communication object received by the apparatus at a first timestamp is identical to (1) the group-based communication object at a digital signature occurrence timestamp and (2) the group-based communication object at the second timestamp, wherein the digital signature occurrence timestamp is subsequent the first timestamp, and wherein the second timestamp is subsequent the digital signature occurrence timestamp.

After the group-based communication server 106 generates a verified integrity indicator associated with the group-based communication object identifier, the group-based communication channel identifier, and the digital signature data structure associated therewith, at 316, the server 106 may be configured to, upon verifying the identity of identity of the digital signature signatory and the integrity of the group-based communication object, create a legally binding statement data structure by permanently associating the verified signatory indicator and the verified integrity indicator with the group-based communication object and the digital signature data structure such that the legally binding statement data structure defines a legally binding statement associated with a first user. In various embodiments, the legally binding statement data structure may comprise at least a group-based communication object, a digital signature data structure, a verified signatory indicator, and a verified integrity indicator. In various embodiments, a legally binding statement data structure may further comprise a digital signature occurrence data structure. In various embodiments, the legally binding statement data structure may be associated with, for example, at least one or more of the digital signature signatory identifier, the first user identifier, the group-based communication channel identifier, and a digital signature occurrence identifier.

After the group-based communication server 106 creates a legally binding statement data structure by permanently associating the verified signatory indicator and the verified integrity indicator with the group-based communication object and the digital signature data structure such that the legally binding statement data structure defines a legally binding statement associated with a first user, the server 106, at block 318, may be configured to append a do-not-edit flag and a do-not-delete flag to the legally binding statement data structure. The do-not-edit flag and a do-not-delete flag may include a symbol representative of an indication to not edit or delete the object and/or digital signature. In various embodiments, the do-not-edit flag may prevent the legally binding statement data structure from being edited. In various embodiments, the do-not-delete flag may prevent the legally binding statement data structure from being deleted.

Figure 4:
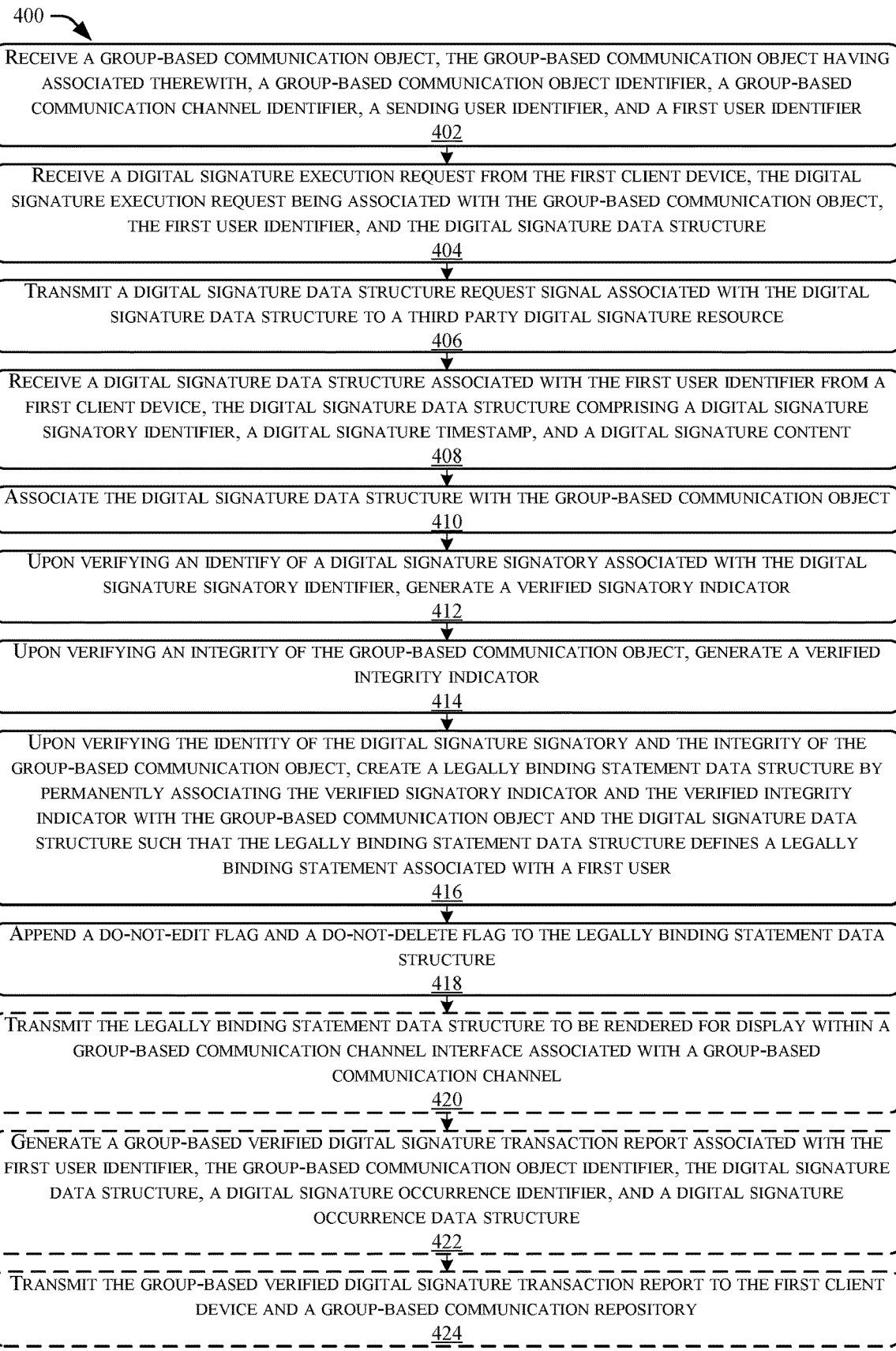
FIG. 4 illustrates a flow diagram of an exemplary method of facilitating a digital signature occurrence associated with a group-based communication object.

FIG. 4 illustrates a flow diagram of an example method 400 in accordance with some embodiments discussed herein.

Blocks 402 through 418 of the exemplary method 400 are at least substantially similar to the steps previously disclosed at blocks 302 through 318, respectively.

At block 420, the group-based communication server 106 is configured to transmit the legally binding statement data structure to be rendered for display within a group-based communication channel interface associated with a group-based communication channel. In various embodiments, the group-based communication channel associated with the group-based communication channel interface may be associated with the first user identifier, the group-based communication object, the digital signature data structure, and the legally binding statement data structure.

After the group-based communication server 106 transmits the legally binding statement data structure to be rendered for display within a group-based communication channel interface associated with a group-based communication channel, the server 106 may be configured to, at block 422, generate a group-based verified digital signature transaction report associated with the first user identifier, the group-based communication object identifier, the digital signature data structure, a digital signature occurrence identifier, and/or a digital signature occurrence data structure. In various embodiments the group-based verified digital signature transaction report may comprise at least the digital signature occurrence data structure, the digital signature data structure, the verified signatory indicator, the verified integrity indicator, the legally binding statement data structure, and the group-based communication object. The digital signature occurrence data structure may include a collection of data associated with a digital signature occurrence capable of being transmitted, received and/or stored. In some embodiments, the digital signature occurrence data structure may comprise a completed digital signature occurrence indicator, a digital signature occurrence timestamp, and a digital signature occurrence identifier. In various embodiments, the digital signature occurrence data structure may comprise data associated with at least one or more of an authenticated group-based communication object request, a digital signature execution request, one or more digital signature consent verification packet, one or more confirmed digital signature consent verification packets, a digital signature data structure request, a digital signature data structure, a group-based communication object identifier, a legally binding statement data structure, and one or more user identifiers. In various embodiments, the digital signature occurrence data structure may comprise digital signature transaction data received by a group-based communication server from a third-party digital signature resource. The digital signature occurrence data structure may be compiled and consolidated into a group-based verified digital signature transaction report for presentation to one or more client devices associated with one or more of a digital signature data structure, an authenticated group-based communication object request, a group-based communication channel, and the like.

In various embodiments, the group-based verified digital signature transaction report may further comprise a verification digital signature. In various embodiments, the group-based verified digital signature transaction report may be associated with a digital signature occurrence identifier. In various embodiments, the group-based verified digital signature transaction report may comprise at least a portion of a group-based communication system data corpus, the at least a portion of a group-based communication system data corpus being associated with the group-based communication object and the digital signature data structure. In such embodiments, the group-based communication system data corpus may include data (e.g., work objects, messages, communication channels, user profiles, etc.) that has been received by the communication platform (e.g., group-based communication system) through one or more interfaces. In various embodiments, the group-based verified digital signature transaction report may be renderable for display within a group-based verified digital signature transaction report interface. In various embodiments, a group-based verified digital signature transaction report interface may be associated with the group-based communication channel identifier associated with the group-based communication channel.

After the group-based communication server 106 generates a group-based verified digital signature transaction report, at block 424, the server 106 may be configured to transmit the group-based verified digital signature transaction report to the first client device 102 and a group-based communication repository 107. In various embodiments, the server 106 may be further configured to transmit the group-based verified digital signature transaction report to one or more client devices associated with the group-based communication channel identifier.

FIG. 5 illustrates a flow diagram of an example method 500 in accordance with some embodiments discussed herein. Blocks 502 through 518 of the exemplary method 500 are at least substantially similar to the steps previously disclosed at blocks 302 through 318, respectively.

At block 520, the group-based communication server 106 may be configured to receive from a second client device associated with a second user identifier an authenticated group-based communication object request associated with the group-based communication object, the authenticated group-based communication object request comprising an authenticated group-based communication object request data packet associated with the group-based communication object, a requested signatory identifier, and the second user identifier, wherein the requested signatory identifier is associated with the first user identifier. The authenticated group-based communication object request may include instructions requesting that the user identifier associated with a requested signatory identifier transmit a digital signature data structure associated with the user's user profile to the group-based communication server to be associated with the group-based communication object. In some embodiments, the authenticated group-based communication object request may include a request to authenticate the group-based communication object comprising the signatory identifier associated with the first user. In various embodiments, an authenticated group-based communication object request may comprise an authenticated group-based communication object request data packet associated with one or more user identifiers comprising at least the sending user identifier and the requested signatory identifier. In various embodiments, authenticated group-based communication object request may comprise an authenticated group-based communication object request indicator (e.g. indication that an authenticated group-based communication object request data packet has been detected). In various embodiments, the authenticated group-based communication object request may comprise an authenticated group-based communication object confirmation request.

In various embodiments, the second client device may be one of a plurality of client devices 101 associated with the group-based communication channel identifier associated with the group-based communication channel. In various embodiments, the second user identifier is associated with the second user profile. The second user identifier may be associated with access rights to a group-based communication channel associated with the group-based communication channel identifier. In various embodiments, the authenticated group-based communication object request may include instructions requesting that the user identifier associated with a requested signatory identifier transmit a digital signature data structure associated with the user's user profile to the group-based communication server to be associated with group-based communication object in a digital signature occurrence. In various embodiments, for example, the authenticated group-based communication object request data packet may include instructions requiring a threshold number of additional digital signature authenticators.

At block 522, the group-based communication server 106 may be configured to, upon verifying the identity of the digital signature signatory (e.g., based on the signatory identifier) and the integrity of the group-based communication object (e.g., based on a comparison of a first state of the object to a second state of the object), transmit a completed digital signature occurrence indicator to the second client device and the first client device, the completed digital signature occurrence indicator comprising an indication of validity of the object. In various embodiments the completed digital signature occurrence indicator may be associated with the legally binding statement data structure, the group-based communication object identifier, the group-based communication channel identifier, and/or the digital signature data structure. In various embodiments, a completed digital signature occurrence indicator may indicate that a particular digital signature occurrence has been successfully completed. In various embodiments, the completed digital signature occurrence indicator may be associated with an authenticated group-based communication object request. In various embodiments, the server 106 may be further configured to transmit a completed digital signature occurrence indicator to one or more of a plurality of client devices associated with the group-based communication channel identifier associated with the group-based communication channel.

FIG. 6 illustrates a flow diagram of an example method 600 in accordance with some embodiments discussed herein. Blocks 602 through 618 of the exemplary method 600 are at least substantially similar to the steps previously disclosed at blocks 302 through 318, respectively.

At block 620, the group-based communication server 106 may be configured to transmit a digital signature consent verification data packet to the first client device, wherein the digital signature consent verification data packet may comprise information directed to confirm a user's intent and consent to conduct business electronically (e.g., authorization statement, consent statement, waiver, etc.). In some embodiments, the digital signature consent verification data packet may include a request for consent from the first user to conduct business electronically. In various embodiments, the digital signature consent verification data packet may include an associated group-based communication object, a digital signature data structure, and/or a user identifier associated with the signatory.

In various embodiments, the digital signature consent verification data packet may comprise a consent disclosure and/or a waiver associated with one or more legal jurisdictions, such as, in a non-limiting example, the Uniform Electronic Transactions Act (UETA) Consumer Consent Disclosures. Further, the server 106 may be configured to receive a confirmed digital signature consent verification data packet from the first client device. The confirmed digital signature consent verification data packet may represent a confirmation that the user consents to conducting business electronically (e.g., authorization to conduct business electronically). The confirmed digital signature consent verification data packet may comprise a digital signature consent verification data packet, the data of which has been modified by a user at the first client device to indicate the user's affirmative intent and consent to conduct business electronically. In various embodiments, the server 106 may be configured to associate an electronic transaction consent indicator with the first user profile associated with the first client device (e.g., store the authorization in the first user profile). In some examples, the request to verify the digital signature of the first user may be sent to the third-party digital signature resource (block 606) based at least in part on the authorization. In various embodiments, the electronic transaction consent indicator may indicate that a user has affirmatively consented to use electronic records and/or methods to conduct business and has not subsequently withdrawn such consent. The electronic transaction consent indicator may be associated with a confirmed digital signature consent verification data packet, and a user profile.

At block 622, the group-based communication server 106 may be configured to transmit one or more authenticated group-based communication object confirmation request to one or more additional client devices, the one or more additional client devices being associated with one or more user identifiers associated with access rights to a group-based communication channel associated with the group-based channel identifier. In various embodiments, the authenticated group-based communication object confirmation request may provide instructions prompting one or more users associated with a user identifier associated with group-based communication channel identifier other than the user identifier associated with the requested signatory identifier to provide confirmation that a legally binding statement data structure comprising the group-based communication object and the digital signature data structure associated with the first user identifier has been created. In various embodiments, the one or more authenticated group-based communication object confirmation request may be associated with an authenticated group-based communication object request. Further, the server 106 may be configured to receive one or more confirmed authenticated group-based communication object confirmation data from the one or more additional client devices. In various embodiments, confirmed authenticated group-based communication object confirmation data may comprise data indicative of an action at the one or more additional client devices that indicates a confirmation that a legally binding statement data structure comprising the group-based communication object and the digital signature data structure associated with the first user identifier has been created. In various embodiments, the receipt by the server 106 of one or more confirmed authenticated group-based communication object confirmation data from the one or more additional client devices may serve to establish the one or more additional users associated with the one or more additional client devices as one or more "witnesses" to the digital signature occurrence. In various embodiments, the confirmed authenticated group-based communication object confirmation data may be associated with the legally binding statement data structure.

FIG. 7 illustrates a flow diagram of an example method 700 in accordance with some embodiments discussed herein. Blocks 702 through 718 of the exemplary method 700 are at least substantially similar to the steps previously disclosed at blocks 302 through 318, respectively.

At block 720, the group-based communication server 106 may be configured to receive a plurality of group-based communication objects in the group-based communication channel and parse each group-based communication object of the plurality of group-based communication objects to detect an authenticated group-based communication object request data packet associated therewith.

In various embodiments, the plurality of group-based communication objects may be received from a plurality of client devices 101 and/or a client device 102.

At block 722, the group-based communication server 106 may be configured to compute a hash based on the group-based communication object, create a verification digital signature based on the hash, and compare the verification digital signature to the digital signature data structure. In various embodiments, the verification digital signature may be associated with the group-based communication object. In various embodiments, the verification digital signature may be associated with the sending user identifier. In various embodiments, for example, the verification digital signature may comprise a private key associated with the sending user identifier. In various embodiments, the verification digital signature may be compared to the digital signature data structure in order to execute one or both of an encryption and a decryption process with respect to either one or both of the group-based communication object and the digital signature data structure. In various embodiments, group-based communication server 106 may be configured to facilitate the execution of a PGP digital signature transaction or any other security credential (e.g., key) transmittal for the purposes of encryption/decryption and/or verification/authentication. In such embodiments, the group-based communication server 106 may be configured to perform an encryption process and/or an authentication process with respect to the object.

Figure 8:
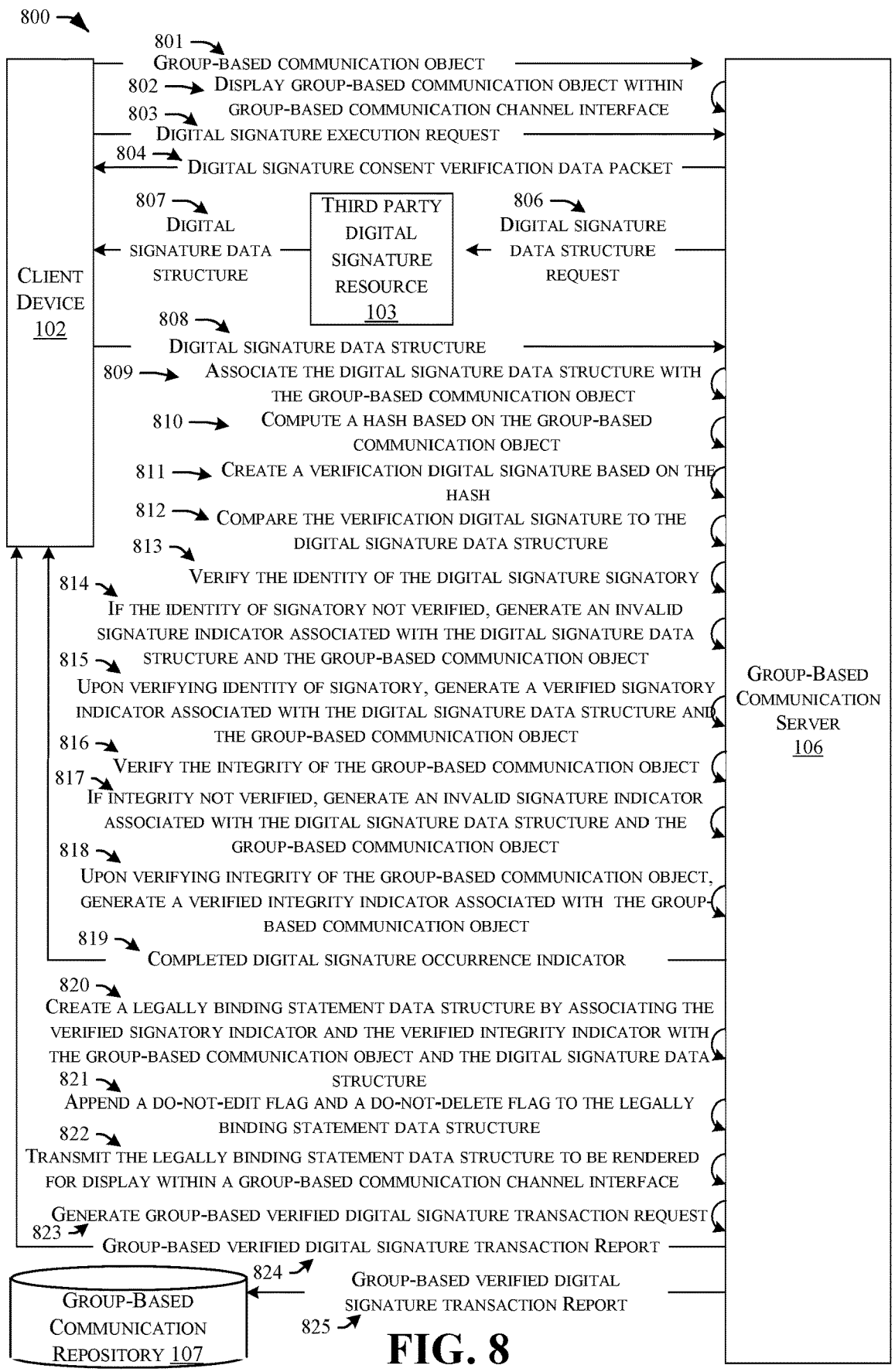
FIG. 8 is a signal diagram illustrating example methods in accordance with some exemplary embodiments of the disclosure.

Referring now to FIG. 8, an example embodiment for facilitating a digital signature occurrence associated with a group-based communication object is provided.

At operation 801, a client device 102 is configured to transmit a group-based communication object to a group-based communication server 106. The client device 102 may be associated with the group-based communication object, a user identifier associated with a user profile and a group-based communication channel identifier associated with a group-based communication channel. The group-based communication object may be associated with a group-based communication object identifier, the group-based communication channel identifier, a sending user identifier, and the user identifier. The group-based communication server 106 may be configured to receive the group-based communication object and, at operation 802, display the group-based communication object within a group-based communication channel interface associated with the group-based communication channel identifier. In various embodiments, the group-based communication channel may be a private group-based communication channel.

At operation 803, the client device 102 may be configured to transmit a digital signature execution request to the group-based communication server 106, which may be configured to receive the digital signature execution request. In various embodiments, the digital signature execution request may be associated with at least the group-based communication object, the user identifier, and a digital signature data structure. In various embodiments, the digital signature execution request may be associated with a digital signature occurrence identifier.

At operation 804, the group-based communication server 106 may be configured to transmit a digital signature consent verification data packet to the client device 102. In various embodiments, the digital signature consent verification data packet may be associated with the client device 102, the user identifier, the user profile, the group-based communication object, and the digital signature data structure. In various embodiments, the digital signature consent verification data packet may be associated with a digital signature occurrence identifier. In various embodiments, the client device 102 may be configured to receive the digital signature consent verification data packet and, at operation 805, transmit a confirmed digital signature consent verification data packet to the group-based communication server 106, which may be configured to receive the confirmed digital signature consent verification data packet. In various embodiments, the confirmed digital signature consent verification data packet may be associated with the digital signature consent verification data packet and may comprise data indicative of an action at the client device 102 that modified the digital signature consent verification data packet so as to indicate an affirmative intent and consent by the user associated with the client device 102 to conduct business electronically. In various embodiments, the server 106 may be configured to associate an electronic transaction consent indicator with the user profile associated with the client device. In various embodiments, the electronic transaction consent indicator may indicate that a user has affirmatively consented to use electronic records and/or methods to conduct business and has not subsequently withdrawn such consent.

At operation 806, the group-based communication server 106 may be configured to transmit a digital signature data structure request to a third-party digital signature resource 103. In various embodiments, the digital signature data structure request may be associated with at least the user identifier, the user profile, and/or the client device 102. The third-party digital signature resource 103 may be configured to at least store one or more digital signature data structures associated with one or more user profiles. In various embodiments, a third-party digital signature resource 103 may be configured to generate one or more digital signature data structures. The third-party digital signature resource may be configured to receive the digital signature data structure request from the group-based communication server 106 and, at operation 807, transmit a digital signature data structure associated with the user identifier to the client device 102, which may be configured to receive the digital signature data structure. In various embodiments, the digital signature data structure may comprise a digital signature signatory identifier, a digital signature timestamp, and digital signature content.

At operation 808, the client device 102 may be configured to transmit the digital signature data structure to the group-based communication server 106. The client device 102 may be associated with the digital signature signatory identifier. In various embodiments, the digital signature data structure may be associated with the digital signature execution request. In various embodiments, the digital signature data structure may be associated with a digital signature occurrence identifier. The group-based communication server 106 may be configured to receive the digital signature data structure from the client device 102 and, at operation 809, associate the digital signature data structure with the group-based communication object. In various embodiments, the digital signature data structure may be further associated with the group-based communication channel identifier associated with the group-based communication channel.

At operation 810, the group-based communication server 106 may be configured to compute a hash based on the group-based communication object. In various embodiments, the hash may be data computed based on a collection of data corresponding to the group-based communication object. Upon computing the hash based on the group-based communication object, the group-based communication server, at operation 811, may be configured to create a verification digital signature based on the hash. In various embodiments, the verification digital signature may be associated with the group-based communication object. In various embodiments, the verification digital signature may be associated with the sending user identifier. In various embodiments, for example, the verification digital signature may comprise a private key associated with the sending user identifier. Upon creating a verification digital signature based on the hash, the group-based communication server, at operation 812, may be configured to compare the verification digital signature to the digital signature data structure. In various embodiments, the group-based communication server 106 may be configured to compare the verification digital signature to the digital signature data structure in order to execute one or both of an encryption and a decryption process with respect to either one or both of the group-based communication object and the digital signature data structure. In various embodiments, group-based communication server 106 may be configured to facilitate the execution of a PGP digital signature transaction or any other security credential (e.g., key) transmittal for the purposes of encryption/decryption and/or verification/authentication.

At operation 813, the group-based communication server 106 may be configured to verify the identity of the digital signature signatory. In various embodiments, verifying the identity of the digital signature signatory may comprise ensuring that the digital signature signatory is the user for whom the digital signature associated with the digital signature data structure is being asserted as a legally binding affirmation of one or more statements present within the group-based communication object. In various embodiments, the group-based communication server 106 may be configured to verify the identity of the digital signature signatory by verifying that the digital signature signatory identifier is associated with the user profile and is identical to the user identifier. Further, in various embodiments, the group-based communication server 106 may be configured to verify that a trust score constructed using a trust model and associated with one or more of the first user identifier, a digital signature signatory identifier, and the group-based communication channel identifier associated with the group-based communication object and/or interaction data associated with the digital signature data structure satisfies a pre-defined trust score threshold. Further, in various embodiments, the group-based communication server 106 may be configured to verify the identity of the digital signature signatory as a result of the group-based communication server 106, at operation 812, comparing the verification digital signature to the digital signature data structure.

At operation 814, the group-based communication server 106 may be configured to, if the identity of digital signature signatory cannot be verified, generate an invalid signature indicator and associate the invalid signature indicator with the digital signature signatory identifier, the digital signature data structure, and the group-based communication object. In various embodiments, an invalid signature indicator may be associated with a digital signature occurrence indicator. In various embodiments, the invalid signature indicator may be rendered for display within the group-based communication object proximate the digital signature data structure or within the group-based communication channel interface proximate the group-based communication object.

Upon verifying the identity of the digital signature signatory, the group-based communication server 106 may be configured to, at operation 815, generate a verified signatory indicator, the verified signatory indicator having associated therewith the user identifier, the user profile, the digital signature signatory identifier, the group-based communication object identifier, the group-based communication channel identifier, and the digital signature data structure. In various embodiments, the verified signatory indicator may be rendered for display within the group-based communication object proximate the digital signature data structure or within the group-based communication channel interface proximate the group-based communication object.

At operation 816, the group-based communication server 106 may be configured to verify the integrity of the group-based communication object. In various embodiments, verifying the integrity of the group-based communication object may comprise ensuring that the content and/or data of a group-based communication object has not been altered since the object was created by an author user and/or since the digital signature data structure associated with the group-based communication object was transmitted to the group-based communication server 106 from the client device 102. In various embodiments, the group-based communication server 106 may be configured to verify the integrity of the group-based communication object by verifying that at a second timestamp, the group-based communication object, which was received by apparatus at a first timestamp, is identical to (1) the group-based communication object at a digital signature occurrence timestamp and (2) the group-based communication object at the second timestamp, wherein the digital signature occurrence timestamp is subsequent the first timestamp, and wherein the second timestamp is subsequent the digital signature occurrence timestamp. In various embodiments, the digital occurrence timestamp may represent a network time associated with the moment at which the digital signature signatory is considered to have digitally "signed" the group-based communication object. Further, in various embodiments, the group-based communication server 106 may be configured to analyze and/or verify that a trust score constructed using a trust model and associated with one or more of the first user identifier, a digital signature signatory identifier, and the group-based communication channel identifier associated with the group-based communication object and/or interaction data associated with the digital signature data structure satisfies a pre-defined trust score threshold. Further, in various embodiments, the group-based communication server 106 may be configured to verify the integrity of the group-based communication object as a result of the group-based communication server 106, at operation 812, comparing the verification digital signature to the digital signature data structure.

At operation 817, the group-based communication server 106 may be configured to, if the integrity of the group-based communication object cannot be verified, generate an invalid signature indicator and associate the invalid signature indicator with the digital signature data structure, and the group-based communication object. In various embodiments, an invalid signature indicator may be associated with a digital signature occurrence indicator. In various embodiments, the invalid signature indicator may be rendered for display within the group-based communication object proximate the digital signature data structure or within the group-based communication channel interface proximate the group-based communication object.

Upon verifying the integrity of the group-based communication object, the group-based communication server 106 may be configured to, at operation 818, generate a verified integrity indicator, the verified integrity indicator having associated therewith the group-based communication object identifier, the group-based communication channel identifier, and the digital signature data structure. In various embodiments, the verified integrity indicator may be rendered for display within the group-based communication object or within the group-based communication channel interface proximate the group-based communication object.

At operation 819, the group-based communication server 106 may be configured to, upon verifying the identity of the digital signature signatory and the integrity of the group-based communication object, transmit a completed digital signature occurrence indicator to the client device 102. The client device 102 may be configured to receive the completed digital signature occurrence indicator. In various embodiments, the completed digital signature occurrence indicator may be associated with the user identifier, the group-based communication object identifier, the group-based communication channel identifier, the digital signature occurrence identifier, and the digital signature data structure.

At operation 820, the group-based communication server 106 may be configured to, upon verifying the identity of identity of the digital signature signatory and the integrity of the group-based communication object, create a legally binding statement data structure by permanently associating the verified signatory indicator and the verified integrity indicator with the group-based communication object and the digital signature data structure such that the legally binding statement data structure defines a legally binding statement associated with the user. In various embodiments, the legally binding statement data structure may comprise at least the group-based communication object, the digital signature data structure, the verified signatory indicator, and the verified integrity indicator. In various embodiments, a legally binding statement data structure may further comprise the digital signature occurrence data structure. In various embodiments, the legally binding statement data structure may be associated with, for example, at least one or more of the digital signature signatory identifier, the user identifier, the group-based communication channel identifier, and the digital signature occurrence identifier.

At operation 821, the group-based communication server 106 may be configured append a do-not-edit flag and a do-not-delete flag to the legally binding statement data structure. In various embodiments, the do-not-edit flag may prevent the legally binding statement data structure from being edited. In various embodiments, the do-not-delete flag may prevent the legally binding statement data structure from being deleted.

At operation 822, the group-based communication server 106 may be configured to transmit the legally binding statement data structure to be rendered for display within the group-based communication channel interface associated with the group-based communication channel. In various embodiments, the group-based communication channel associated with the group-based communication channel interface may be associated with the user identifier, the group-based communication object, the digital signature data structure, and the legally binding statement data structure.

At operation 823, the group-based communication server 106 may be configured to generate a group-based verified digital signature transaction report associated with the first user identifier, the group-based communication object identifier, the digital signature data structure, a digital signature occurrence identifier, and a digital signature occurrence data structure. In various embodiments the group-based verified digital signature transaction report may comprise at least the digital signature occurrence data structure, the digital signature data structure, the verified signatory indicator, the verified integrity indicator, the legally binding statement data structure, and the group-based communication object. In various embodiments, the group-based verified digital signature transaction report may further comprise the verification digital signature. In various embodiments, the group-based verified digital signature transaction report may be associated with the digital signature occurrence identifier. In various embodiments, the group-based verified digital signature transaction report may comprise at least a portion of a group-based communication system data corpus, the at least a portion of the group-based communication system data corpus being associated with the group-based communication object and the digital signature data structure. In various embodiments, the group-based verified digital signature transaction report may be renderable for display within a group-based verified digital signature transaction report interface. In various embodiments, the group-based verified digital signature transaction report interface may be associated with the group-based communication channel identifier associated with the group-based communication channel.

At operation 824, the group-based communication server 106 may be configured to transmit the group-based verified digital signature transaction report to the client device 102. The client device 102 may be configured to receive the group-based verified digital signature transaction report. In various embodiments, the group-based verified digital signature transaction report may be renderable for display at the client device 102.

At operation 825, the group-based communication server 106 may be configured to transmit the group-based verified digital signature transaction report to the group-based communication repository 107. The group-based communication repository 107 may be configured to receive the group-based verified digital signature transaction report. In various embodiments, the group-based communication repository 107 may be configured to retain the group-based verified digital signature transaction report such that it may reproduce the group-based verified digital signature transaction report when prompted by the client device 102 and/or any client device associated with a user identifier associated with access rights to the group-based communication channel associated with the group-based communication channel identifier.

Figure 9:
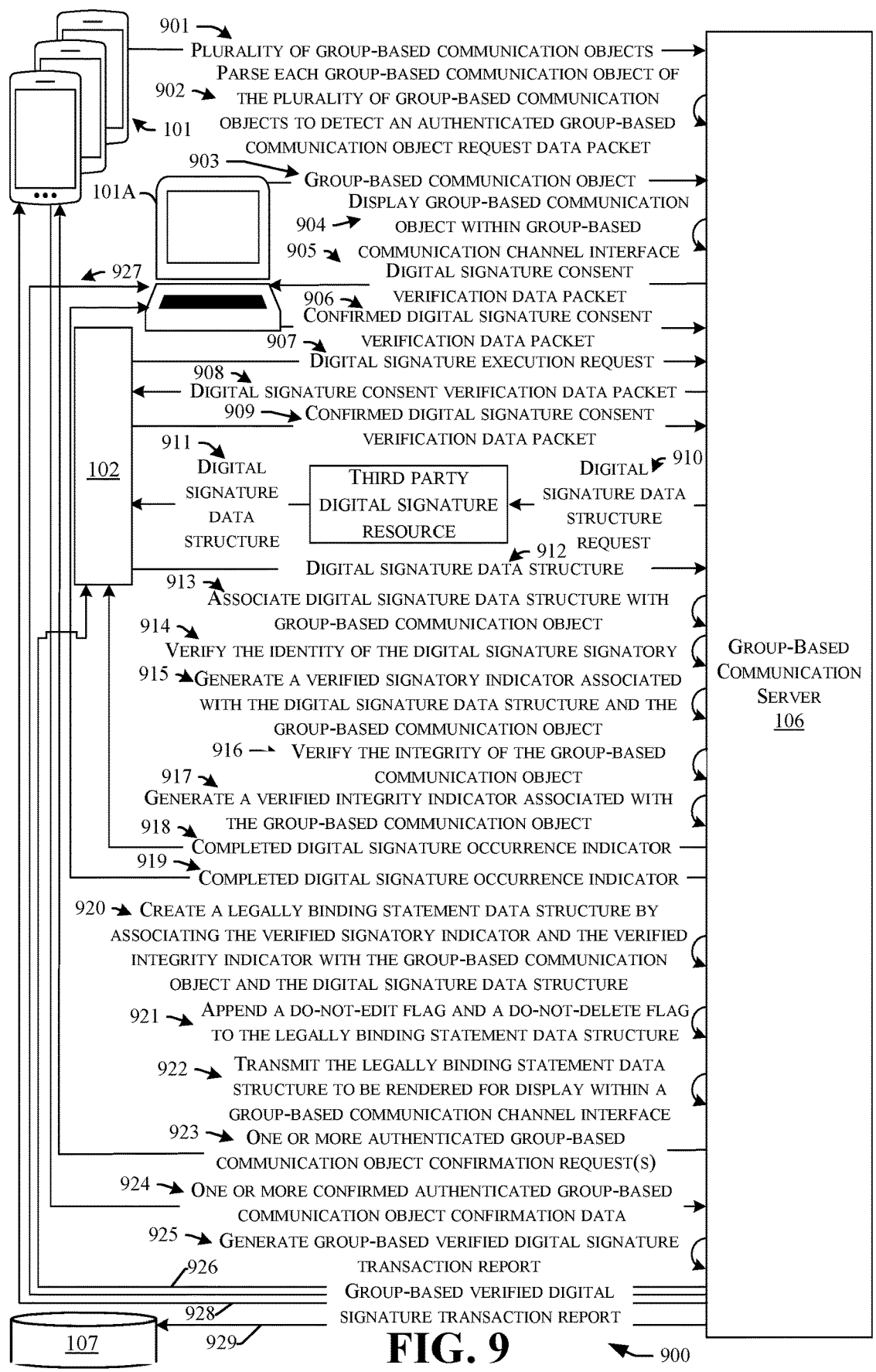
FIG. 9 is a signal diagram illustrating example methods in accordance with some exemplary embodiments of the disclosure.

Referring now to FIG. 9, an example embodiment for facilitating a digital signature occurrence associated with a group-based communication object is provided.

At operation 901, a plurality of client devices 101 is configured to transmit a plurality of group-based communication objects to a group-based communication server 106. The plurality of client devices 101 may each respectively be associated with a user identifier associated with a user profile. The plurality of client devices 101 may each be associated with a group-based communication channel identifier associated with a group-based communication channel. The plurality of group-based communication objects may each respectively be associated with a group-based communication object identifier, a sending user identifier, and a user identifier associated with one of the client devices of the plurality of client devices 101. The plurality of group-based communication objects may each be associated with the group-based communication channel identifier. Each of the user identifiers associated with the plurality of client devices 101 may be associated with access rights to the group-based communication channel associated with the group-based communication channel identifier. The group-based communication server 106 may be configured to receive the group-based communication object and, at operation 902, parse each group-based communication object of the plurality of group-based communication objects to detect an authenticated group-based communication object request data packet associated therewith.

At operation 903, a second client device 101A of the plurality of client devices 101 may be configured to transmit a group-based communication object to the group-based communication server 106. The second client device 101A may be associated with the group-based communication object, a second user identifier associated with a second user profile, and the group-based communication channel identifier associated with the group-based communication channel. In various embodiments, the second user identifier may be associated with a second organization identifier. In various embodiments, the second organization identifier may be associated with access rights to the group-based communication channel associated with the group-based communication channel identifier. The group-based communication object may be associated with a group-based communication object identifier, the group-based communication channel identifier, a sending user identifier, the second user identifier, and a first user identifier, wherein the sending user identifier is associated with the second user identifier. In various embodiments, the second user identifier is associated with access rights to the group-based communication channel associated with the group-based communication channel identifier. In various embodiments, the group-based communication object may have an authenticated group-based communication object request data packet associated therewith. In various embodiments, the authenticated group-based communication object request data packet may be associated with an authenticated group-based communication object request, which may provide instructions requesting that user associated with a user identifier associated with a requested signatory identifier transmit a digital signature data structure associated with the user's user profile to the group-based communication server to be associated with group-based communication object in a digital signature occurrence. In various embodiments, the requested signatory identifier may be associated with the first user identifier. In various embodiments, the first user identifier may be associated with at least a requested signatory identifier, a first client device 102, a first user profile, the group-based communication object, the authenticated group-based communication object request data packet, and the group-based communication channel identifier associated with the group-based communication channel. In various embodiments, the authenticated group-based communication object request data packet may be associated with the user identifier. The group-based communication server 106 may be configured to receive the group-based communication object and, at operation 904, display the group-based communication object within a group-based communication channel interface associated with the group-based communication channel identifier. In various embodiments, the group-based communication channel may be a private group-based communication channel. In various embodiments, the group-based communication server may be configured to generate an authenticated group-based communication object request indicator associated with the group-based communication object. In various embodiments, the authenticated group-based communication object request indicator may be rendered for display within a group-based communication channel interface proximate the group-based communication object.

At operation 905, the group-based communication server 106 may be configured to transmit a digital signature consent verification data packet to the second client device 101A. In various embodiments, the group-based communication server 106 may be configured to transmit the digital signature consent verification data packet to the second client device 101A upon detecting the authenticated group-based communication object request data packet in which the requested signatory identifier is associated with the first user identifier. In various embodiments, the digital signature consent verification data packet may be associated with the second client device 101A, the second user identifier, the second user profile, and the group-based communication object. In various embodiments, the digital signature consent verification data packet may be associated with a digital signature occurrence identifier. In various embodiments, the second client device 101A may be configured to receive the digital signature consent verification data packet and, at operation 906, transmit a confirmed digital signature consent verification data packet to the group-based communication server 106, which may be configured to receive the confirmed digital signature consent verification data packet. In various embodiments, the confirmed digital signature consent verification data packet may be associated with the digital signature consent verification data packet and may comprise data indicative of an action at the second client device 101A that modified the digital signature consent verification data packet so as to indicate an affirmative intent and consent by a second user associated with the second client device 101A to conduct business electronically. In various embodiments, the server 106 may be configured to associate an electronic transaction consent indicator with the second user profile associated with the second client device 101A. In various embodiments, the electronic transaction consent indicator may indicate that a user has affirmatively consented to use electronic records and/or methods to conduct business and has not subsequently withdrawn such consent.

At operation 907, the first client device 102 may be configured to transmit a digital signature execution request to the group-based communication server 106, which may be configured to receive the digital signature execution request. The first client device 102 may be associated with the group-based communication object, the first user identifier associated with the first user profile, and the group-based communication channel identifier associated with the group-based communication channel. In various embodiments, the first user identifier is associated with access rights to the group-based communication channel associated with the group-based communication channel identifier. In various embodiments, the first user identifier may be associated with a first organization identifier. In various embodiments, the first organization identifier may be associated with access rights to the group-based communication channel associated with the group-based communication channel identifier. In various embodiments, the digital signature execution request may be associated with at least the group-based communication object, the first user identifier, and a digital signature data structure. In various embodiments, the digital signature execution request may be associated with the authenticated group-based communication object request. In various embodiments, the digital signature execution request may be associated with a digital signature occurrence identifier.

At operation 908, the group-based communication server 106 may be configured to transmit a digital signature consent verification data packet to the first client device 102. In various embodiments, the digital signature consent verification data packet may be associated with the first client device 102, the first user identifier, the first user profile, the group-based communication object, and the digital signature data structure. In various embodiments, the group-based communication server 106 may be configured to transmit the digital signature consent verification data packet to the first client device 102 upon receiving the digital signature execution request. In various embodiments, the digital signature consent verification data packet may be associated with a digital signature occurrence identifier. In various embodiments, the first client device 102 may be configured to receive the digital signature consent verification data packet and, at operation 909, transmit a confirmed digital signature consent verification data packet to the group-based communication server 106, which may be configured to receive the confirmed digital signature consent verification data packet. In various embodiments, the confirmed digital signature consent verification data packet may be associated with the digital signature consent verification data packet and may comprise data indicative of an action at the first client device 102 that modified the digital signature consent verification data packet so as to indicate an affirmative intent and consent by a first user associated with the first client device 102 to conduct business electronically. In various embodiments, the server 106 may be configured to associate an electronic transaction consent indicator with the first user profile associated with the first client device 102. In various embodiments, the electronic transaction consent indicator may indicate that a user has affirmatively consented to use electronic records and/or methods to conduct business and has not subsequently withdrawn such consent.

At operation 910, the group-based communication server 106 may be configured to transmit a digital signature data structure request to a third-party digital signature resource 103. In various embodiments, the digital signature data structure request may be associated with at least one or more of the first user identifier, the first user profile, and the first client device 102. The third-party digital signature resource 103 may be configured to at least store one or more digital signature data structures associated with one or more user profiles. In various embodiments, a third-party digital signature resource 103 may be configured to generate one or more digital signature data structures associated with one or more user profiles. In various embodiments, wherein a client device 102 is configured to store and/or generate a digital signature data structure associated with the user identifier associated with the client device 102 the group-based communication server 106 may be configured to transmit a digital signature data structure request to the client device 102. The third-party digital signature resource may be configured to receive the digital signature data structure request associated with from the group-based communication server 106 and, at operation 911, transmit a digital signature data structure associated with at least one or more of the first user identifier, the first user profile, and the first client device 102 to the first client device 102, which may be configured to receive the digital signature data structure. In various embodiments, the digital signature data structure may comprise a digital signature signatory identifier, a digital signature timestamp, and digital signature content.

At operation 912, the first client device 102 may be configured to transmit the digital signature data structure to the group-based communication server 106. The first client device 102 may be associated with the digital signature signatory identifier. In various embodiments, the digital signature data structure may be associated with the digital signature execution request. In various embodiments, the digital signature data structure may be associated with a digital signature occurrence identifier. The group-based communication server 106 may be configured to receive the digital signature data structure from the first client device 102 and, at operation 913, associate the digital signature data structure with the group-based communication object. In various embodiments, the digital signature data structure may be further associated with the group-based communication channel identifier associated with the group-based communication channel.

At operation 914, the group-based communication server 106 may be configured to verify the identity of the digital signature signatory. In various embodiments, verifying the identity of the digital signature signatory may comprise ensuring that the digital signature signatory is the user for whom the digital signature associated with the digital signature data structure is being asserted as a legally binding affirmation of one or more statements present within the group-based communication object. In various embodiments, the group-based communication server 106 may be configured to verify the identity of the digital signature signatory by verifying that the digital signature signatory identifier is associated with the first user profile and is identical to the first user identifier. Further, in various embodiments, the group-based communication server 106 may be configured to verify that a trust score constructed using a trust model and associated with one or more of the first user identifier, a digital signature signatory identifier, and the group-based communication channel identifier associated with the group-based communication object and/or interaction data associated with the digital signature data structure satisfies a pre-defined trust score threshold. In various embodiments, wherein the identity of digital signature signatory cannot be verified, the group-based communication server 106 may be configured to generate an invalid signature indicator and associate the invalid signature indicator with the digital signature signatory identifier, the digital signature data structure, and the group-based communication object. In various embodiments, an invalid signature indicator may be associated with a digital signature occurrence identifier. In various embodiments, the invalid signature indicator may be rendered for display within the group-based communication object proximate the digital signature data structure or within the group-based communication channel interface proximate the group-based communication object.

Upon verifying the identity of the digital signature signatory, the group-based communication server 106 may be configured to, at operation 915, generate a verified signatory indicator, the verified signatory indicator having associated therewith the first user identifier, the first user profile, the digital signature signatory identifier, the group-based communication object identifier, the group-based communication channel identifier, and the digital signature data structure. In various embodiments, a verified signatory indicator may be associated with a digital signature occurrence identifier. In various embodiments, the verified signatory indicator may be rendered for display within the group-based communication object proximate the digital signature data structure or within the group-based communication channel interface proximate the group-based communication object.

At operation 916, the group-based communication server 106 may be configured to verify the integrity of the group-based communication object. In various embodiments, verifying the integrity of the group-based communication object may comprise ensuring that the content and/or data of a group-based communication object has not been altered since the object was created by an author user, since the group-based communication object was transmitted to the server 106 from the second client device 101A, and/or since the digital signature data structure associated with the group-based communication object was transmitted to the group-based communication server 106 from the first client device 102. In various embodiments, the group-based communication server 106 may be configured to verify the integrity of the group-based communication object by verifying that at a second timestamp, the group-based communication object, which was received by apparatus at a first timestamp, is identical to (1) the group-based communication object at a digital signature occurrence timestamp and (2) the group-based communication object at the second timestamp, wherein the digital signature occurrence timestamp is subsequent the first timestamp, and wherein the second timestamp is subsequent the digital signature occurrence timestamp. In various embodiments, the digital occurrence timestamp may represent a network time associated with the moment at which the digital signature signatory is considered to have digitally "signed" the group-based communication object. Further, in various embodiments, the group-based communication server 106 may be configured to analyze and/or verify that a trust score constructed using a trust model and associated with one or more of the first user identifier, a digital signature signatory identifier, and the group-based communication channel identifier associated with the group-based communication object and/or interaction data associated with the digital signature data structure satisfies a pre-defined trust score threshold. In various embodiments, wherein the integrity of the group-based communication object cannot be verified, the group-based communication server 106 generate an invalid signature indicator and associate the invalid signature indicator with the digital signature data structure and the group-based communication object. In various embodiments, an invalid signature indicator may be associated with a digital signature occurrence indicator. In various embodiments, the invalid signature indicator may be rendered for display within the group-based communication object proximate the digital signature data structure or within the group-based communication channel interface proximate the group-based communication object.

Upon verifying the integrity of the group-based communication object, the group-based communication server 106 may be configured to, at operation 917, generate a verified integrity indicator, the verified integrity indicator having associated therewith the group-based communication object identifier, the group-based communication channel identifier, and the digital signature data structure. In various embodiments, the verified integrity indicator may be rendered for display within the group-based communication object or within the group-based communication channel interface proximate the group-based communication object.

At operation 918, the group-based communication server 106 may be configured to, upon verifying the identity of the digital signature signatory and the integrity of the group-based communication object, transmit a completed digital signature occurrence indicator to the first client device 102. The first client device 102 may be configured to receive the completed digital signature occurrence indicator. In various embodiments, the completed digital signature occurrence indicator may be associated with the first user identifier, the group-based communication object identifier, the group-based communication channel identifier, the digital signature occurrence identifier, and the digital signature data structure.

At operation 919, the group-based communication server 106 may be configured to, upon verifying the identity of the digital signature signatory and the integrity of the group-based communication object, transmit a completed digital signature occurrence indicator to the second client device 101A. The second client device 101A may be configured to receive the completed digital signature occurrence indicator. In various embodiments, the completed digital signature occurrence indicator may be associated with the second user identifier, the group-based communication object identifier, the group-based communication channel identifier, the digital signature occurrence identifier, and the digital signature data structure. In various embodiments, the group-based communication server 106 may be configured to render for display within the group-based communication channel interface the completed digital signature occurrence indicator.

At operation 920, the group-based communication server 106 may be configured to, upon verifying the identity of identity of the digital signature signatory and the integrity of the group-based communication object, create a legally binding statement data structure by permanently associating the verified signatory indicator and the verified integrity indicator with the group-based communication object and the digital signature data structure such that the legally binding statement data structure defines a legally binding statement associated with the first user. In various embodiments, the legally binding statement data structure may further define a legally binding statement associated with the second user. In various embodiments, the legally binding statement data structure may comprise at least the group-based communication object, the digital signature data structure, the verified signatory indicator, and the verified integrity indicator. In various embodiments, a legally binding statement data structure may further comprise the digital signature occurrence data structure. In various embodiments, the legally binding statement data structure may be associated with, for example, at least one or more of the digital signature signatory identifier, the first user identifier, the second user identifier, the group-based communication channel identifier, and the digital signature occurrence identifier.

At operation 921, the group-based communication server 106 may be configured append a do-not-edit flag and a do-not-delete flag to the legally binding statement data structure. In various embodiments, the do-not-edit flag may prevent the legally binding statement data structure from being edited. In various embodiments, the do-not-delete flag may prevent the legally binding statement data structure from being deleted.

At operation 922, the group-based communication server 106 may be configured to transmit the legally binding statement data structure to be rendered for display within the group-based communication channel interface associated with the group-based communication channel. In various embodiments, the group-based communication channel associated with the group-based communication channel interface may be associated with the user identifier, the group-based communication object, the digital signature data structure, and the legally binding statement data structure.

At operation 923, the group-based communication server 106 may be configured to transmit one or more authenticated group-based communication object confirmation requests to one or more additional client devices of the plurality of client devices 101. The one or more additional client devices of the plurality of client devices 101 may comprise one or more client devices of the plurality of client devices 101 not associated with either the first user identifier or the second user identifier. The one or more additional client devices of the plurality of client devices 101 may not include the first client device 102 or the second client device 101A. In various embodiments, the authenticated group-based communication object confirmation request may provide instructions prompting one or more users associated with the to one or more additional client devices of the plurality of client devices 101 to provide confirmation that a legally binding statement data structure comprising the group-based communication object and the digital signature data structure associated with the first user identifier has been created. In various embodiments, the one or more authenticated group-based communication object confirmation requests may be associated with the legally binding statement data structure. In various embodiments, the authenticated group-based communication object confirmation request may be associated with the authenticated group-based communication object request. The one or more additional client devices of the plurality of client devices 101 may be configured to receive the one or more authenticated group-based communication object confirmation requests and, at operation 924, transmit one or more confirmed authenticated group-based communication object confirmation data to the group-based communication server 106. The server 106 may be configured to receive the one or more confirmed authenticated group-based communication object confirmation data from the one or more additional client devices. In various embodiments, confirmed authenticated group-based communication object confirmation data may comprise data indicative of an action at the one or more additional client devices that indicates a confirmation that a legally binding statement data structure comprising the group-based communication object and the digital signature data structure associated with the first user identifier has been created. In various embodiments, the one or more confirmed authenticated group-based communication object confirmation data may be associated with the legally binding statement data structure. In various embodiments, the receipt by the server 106 of one or more confirmed authenticated group-based communication object confirmation data from the one or more additional client devices may serve to establish the one or more additional users associated with the one or more additional client devices as one or more "witnesses" to the digital signature occurrence. In various embodiments, the confirmed authenticated group-based communication object confirmation data may be associated with the legally binding statement data structure.

At operation 925, the group-based communication server 106 may be configured to generate a group-based verified digital signature transaction report associated with the first user identifier, the second user identifier, the group-based communication object identifier, the digital signature data structure, a digital signature occurrence identifier, and a digital signature occurrence data structure. In various embodiments the group-based verified digital signature transaction report may comprise at least the digital signature occurrence data structure and the legally binding statement data structure. In various embodiments the group-based verified digital signature transaction report may comprise the authenticated group-based communication object request data packet. In various embodiments, the group-based verified digital signature transaction report may be associated with the digital signature occurrence identifier. In various embodiments, the group-based verified digital signature transaction report may be associated with the first client device 102 and the second client device 101A. In various embodiments, the group-based verified digital signature transaction report may be associated with the authenticated group-based communication object request. In various embodiments, the group-based verified digital signature transaction report may comprise at least a portion of a group-based communication system data corpus, the at least a portion of the group-based communication system data corpus being associated with the group-based communication object and the digital signature data structure. In various embodiments, the group-based verified digital signature transaction report may be renderable for display within a group-based verified digital signature transaction report interface. In various embodiments, the group-based verified digital signature transaction report interface may be associated with the group-based communication channel identifier associated with the group-based communication channel.

At operation 926, the group-based communication server 106 may be configured to transmit the group-based verified digital signature transaction report to the first client device 102. The first client device 102 may be configured to receive the group-based verified digital signature transaction report. In various embodiments, the group-based verified digital signature transaction report may be renderable for display at the first client device 102.

At operation 928, the group-based communication server 106 may be configured to transmit the group-based verified digital signature transaction report to the second client device 101A. The second client device 101A may be configured to receive the group-based verified digital signature transaction report. In various embodiments, the group-based verified digital signature transaction report may be renderable for display at the second client device 101A.

At operation 928, the group-based communication server 106 may be configured to transmit the group-based verified digital signature transaction report to each of the plurality of client devices 101. The plurality of client devices 101 may each be configured to receive the group-based verified digital signature transaction report. In various embodiments, the group-based verified digital signature transaction report may be renderable for display at each of the plurality of client devices 101.

At operation 929, the group-based communication server 106 may be configured to transmit the group-based verified digital signature transaction report to the group-based communication repository 107. The group-based communication repository 107 may be configured to receive the group-based verified digital signature transaction report. In various embodiments, the group-based communication repository 107 may be configured to retain the group-based verified digital signature transaction report such that it may reproduce the group-based verified digital signature transaction report when prompted by either the first client device 102, the second client device 101A, one or more of the plurality of client devices 101, and/or any client device associated with a user identifier associated with access rights to the group-based communication channel associated with the group-based communication channel identifier.

Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving, from a first computing device of a first user and via a communication channel of a group-based communication system, a document and a digital signature request for a second user to digitally sign the document;
based at least in part on the digital signature request, causing to display, via a second computing device of the second user, the document and a first notification of the digital signature request;
receiving, from the second computing device, digital signature data corresponding to a digital signature provided by the second user;
generating a modified document based on the document and the digital signature data;
storing the modified document in a database;
causing to display, via the first computing device, a second notification indicating an availability of the modified document,
at least partly responsive to causing display of the second notification, receiving, from the first computing device, an access request to access the modified document; and
at least partly responsive to receiving the access request, causing to display, via the first computing device, the modified document.

2. The method as claim 1 recites, further comprising:
receiving the digital signature request via input to a first user interface displayed via the first computing device.

3. The method as claim 2 recites, wherein the access request is received via the first user interface or via a second user interface displayed via the first computing device.

4. The method as claim 1 recites, wherein the second user is a member of the communication channel and wherein sending the first notification comprises sending the first notification via the communication channel.

5. The method as claim 1 recites, further comprising:
associating the document with a group-based communication channel identifier and a document identifier.

6. The method as claim 1 recites, wherein the document was created from within the group-based communication system.

7. The method as claim 1 recites, further comprising:
before storing the modified document, verifying that the digital signature data is associated with a confirmed digital signature of the second user.

8. The method as claim 1 recites, wherein the first user and the second user comprise users of the group-based communication system, and the method further comprising:
associating a first user identifier with the first user and a second user identifier with the second user.

9. A system comprising:
one or more processors; and
one or more non-transitory computer-readable media storing instructions executable by the one or more processors, wherein the instructions program the one or more processors to perform acts comprising:
receiving, by one or more server computing devices associated with a group-based communication system and from a first computing device of a first user and via a communication channel of the group-based communication system, a document and a digital signature request for a second user to digitally sign the document;
based at least in part on the digital signature request, causing to display, by the one or more server computing devices and via a second computing device of the second user, the document and a first notification of the digital signature request;
receiving, by the one or more server computing devices and from the second computing device, digital signature data corresponding to a digital signature provided by the second user;
generating, by the one or more server computing devices, a modified document based on the document and the digital signature data;
storing, by the one or more server computing devices, the modified document in a database;
causing to display, by the one or more server computing devices and via the first computing device, a second notification indicating an availability of the modified document;
at least partly responsive to causing display of the second notification, receiving, by the one or more server computing devices and from the first computing device, an access request to access the modified document; and
at least partly responsive to receiving the access request, causing to display, by the one or more server computing devices and via the first computing device, the modified document.

10. The system as claim 9 recites, the acts further comprising:
receiving, by the one or more server computing devices, the digital signature request via input to a first user interface displayed via the first computing device.

11. The system as claim 10 recites, wherein the access request is received via the first user interface or via a second user interface displayed via the first computing device.

12. The system as claim 9 recites, wherein the second user is a member of the communication channel and wherein sending the first notification comprises sending the first notification via the communication channel.

13. The system as claim 9 recites, the acts further comprising:
associating, by the one or more server computing devices, the document with a group-based communication channel identifier and a document identifier.

14. The system as claim 9 recites, wherein the document was created from within the group-based communication system.

15. The system as claim 9 recites, the acts further comprising:
before storing the modified document, verifying, by the one or more server computing devices, that the digital signature data is associated with a confirmed digital signature of the second user.

16. The system as claim 9 recites, wherein the first user and the second user comprise users of the group-based communication system, and the acts further comprising:
associating, by the one or more server computing devices, a first user identifier with the first user and a second user identifier with the second user.

17. One or more non-transitory computer-readable media storing instructions executable by one or more processors that, when executed by the one or more processors, cause the one or more processors to perform acts comprising:
receiving, by one or more server computing devices associated with a group-based communication system and from a first computing device of a first user and via a communication channel of the group-based communication system, a document and a digital signature request for a second user to digitally sign the document;
based at least in part on the digital signature request, causing to display, by the one or more server computing devices and via a second computing device of the second user, the document and a first notification of the digital signature request;
receiving, by the one or more server computing devices and from the second computing device, digital signature data corresponding to a digital signature provided by the second user;
generating, by the one or more server computing devices, a modified document based on the document and the digital signature data;
storing, by the one or more server computing devices, the modified document in a database;
causing to display, by the one or more server computing devices and via the first computing device, a second notification indicating an availability of the modified document;
at least partly responsive to causing display of the second notification, receiving, by the one or more server computing devices and from the first computing device, an access request to access the modified document; and at least partly responsive to receiving the access request, causing to display, by the one or more server computing devices and via the first computing device, the modified document.

18. The one or more non-transitory computer-readable media as claim 17 recites, the acts further comprising:
receiving, by the one or more server computing devices, the digital signature request via input to a first user interface displayed via the first computing device.

19. The one or more non-transitory computer-readable media as claim 18 recites,
wherein the access request is received via the first user interface or via a second user interface displayed via the first computing device.

20. The one or more non-transitory computer-readable media as claim 17 recites, wherein the second user is a member of the communication channel and wherein sending the first notification comprises sending the first notification via the communication channel.

* * * * *